United States Patent [19]
Hamming

[11] Patent Number: 6,034,839
[45] Date of Patent: Mar. 7, 2000

[54] MECHANISM AND METHOD FOR LOADING A TAPE FROM A CARTRIDGE TO A TAKE-UP REEL

[75] Inventor: John A. Hamming, Laguna Niguel, Calif.

[73] Assignee: Seagate Technology, Inc., Scotts Valley, Calif.

[21] Appl. No.: 09/100,750

[22] Filed: Jun. 22, 1998

Related U.S. Application Data

[60] Provisional application No. 60/064,814, Nov. 7, 1997.

[51] Int. Cl.[7] .............................. G11B 5/008; G03B 1/02
[52] U.S. Cl. ........................................... 360/95; 242/332.4
[58] Field of Search .................... 360/95; 242/332–332.8

[56] References Cited

U.S. PATENT DOCUMENTS 4,335,858  6/1982  Cranna .................................. 242/332.4
4,608,614  8/1986  Rinkleib ..................................... 360/95

*Primary Examiner*—A. J. Heinz
*Attorney, Agent, or Firm*—McDermott, Will & Emery

[57] ABSTRACT

A tape drive loading mechanism and method of loading a tape leader pin from a single reel cartridge to a take-up reel housed within a transport cabinet includes a hub filler having a slot for receiving the tape leader pin. The hub filler is connected to a load arm that controls the movements of the hub filler. The tape drive loading mechanism includes a load gear arm having gear teeth extending along a linear side portion and along an arcuate portion for approximately 180°. The gear teeth are engaged with a plurality of gears that are driven by a motive element. The motive element, in combination with several guide tracks, forces the load gear arm and the connected load arm to transport the hub filler and tape leader pin through an arcuate path and along a linear path to a loaded position on the take-up reel.

19 Claims, 25 Drawing Sheets

MECHANISM AND METHOD FOR LOADING A TAPE FROM A CARTRIDGE TO A TAKE-UP REEL

This application is based upon Provisional Patent Application Ser. No. 60/064,814, filed on Nov. 7, 1997.

TECHNICAL FIELD

The present invention relates generally to a tape drive loading mechanism and a method of loading tape in a tape drive. More particularly, the present invention relates to a tape drive loading mechanism that automatically loads a tape from a tape cartridge onto the hub of a take-up reel when the tape cartridge is loaded into a tape drive.

BACKGROUND ART

Early reel-to-reel tape drives for recording and playing back digital data typically required manual loading of the tape through the tape drive and manual attachment of the terminal end of the tape to a take-up reel. Motors are used to rotate the reels in order to allow the information containing medium, such as magnetic tape, to pass before a read/write head of the tape drive head assembly in order to read information from or write information onto the tape.

Such a tape drive that requires manual loading of the tape has many disadvantages. For example, manual loading of the tape may greatly inconvenience the user of the tape drive, even assuming that the user can correctly load the tape. An automatic tape drive loading mechanism is therefore desirable.

An automatic tape drive loading mechanism design needs to take into consideration physical constraints placed upon the loading mechanism by the size and shape of a tape drive cabinet in which the loading mechanism is installed. The trend towards miniaturization of various devices that utilize tape drives (such as computers) requires that the tape drive loading mechanism take up a minimal amount of space within the device. Space is at a premium within these devices and needs to be reserved to the greatest extent possible for the electrical components within the device. Accordingly, there is a need for a tape drive loading mechanism that requires only a relatively small amount of space to perform its intended function properly.

A second physical constraint placed upon the loading mechanism is a weight limitation. In order to increase portability of devices, the device components should normally be as light as possible. On the other hand, the components need to be durable enough to withstand daily usage. Accordingly, there exists a need for a tape drive loading mechanism that is lightweight yet durable enough to require only a minimal amount of maintenance over the lifetime of the product.

SUMMARY OF THE INVENTION

These and other needs are met by the present invention which provides a tape drive loading mechanism used to load a tape leader pin from a single reel cartridge to a take-up reel housed within a transport cabinet. The transport cabinet also houses a conventional head assembly that is capable of reading information from the tape and writing information to the tape. The loading mechanism positions the tape in contact with the head of the head assembly in order to facilitate the transfer of data between the head assembly and the data storage medium or tape.

In certain embodiments of the invention, the tape drive loading mechanism includes a hub filler having a slot for receiving the tape leader pin. The hub filler is connected to a load arm that controls the movements of the hub filler. The tape drive loading mechanism includes a load gear arm having gear teeth extending along a linear side portion and along an arcuate portion for approximately 180°. The gear teeth are engaged with a plurality of gears that are driven by a motive element. The motive element, in combination with several guide tracks, forces the load gear arm and the connected load arm to transport the hub filler and tape leader pin through an arcuate path and along a linear path to a loaded position on the take-up reel.

The loading mechanism requires only a small amount of space to perform its intended purpose because the size and number of parts of the loading mechanism are minimized, and the space provided for the loading mechanism is fully utilized. The loading mechanism requires only one motive element to create both a rotational and a translation motion of the load arm, thereby limiting the amount of space required to house the loading mechanism. Additionally, the majority of the moving parts, such as the load gear arm, the load arm, and the hub filler, can be manufactured from relatively thin pieces of material which reduces the amount of space needed for their movement.

The earlier stated needs are also met by certain embodiments of a method of the present invention that includes rotating a load member and an attached second member to a position whereby the second member is adjacent the leader pin when the leader pin is in an unloaded state on the tape cartridge. The leader pin is received within the second member, and the load member is rotated and translated to transport the leader pin to a loaded state on the take-up reel. The method of the present invention provides a simple and reliable process for loading tape into a tape drive.

Additional objects, advantages and other features of the present invention will become readily apparent to those skilled in this art from the following detailed description. The detailed description depicts and describes two embodiments including a preferred embodiment of the invention, simply by way of illustration of the best mode contemplated for carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive. Further objects and advantages of the invention may also be realized and obtained as particularly pointed out in the appended claims.

DETAILED DESCRIPTION OF THE INVENTION

Figure 1:
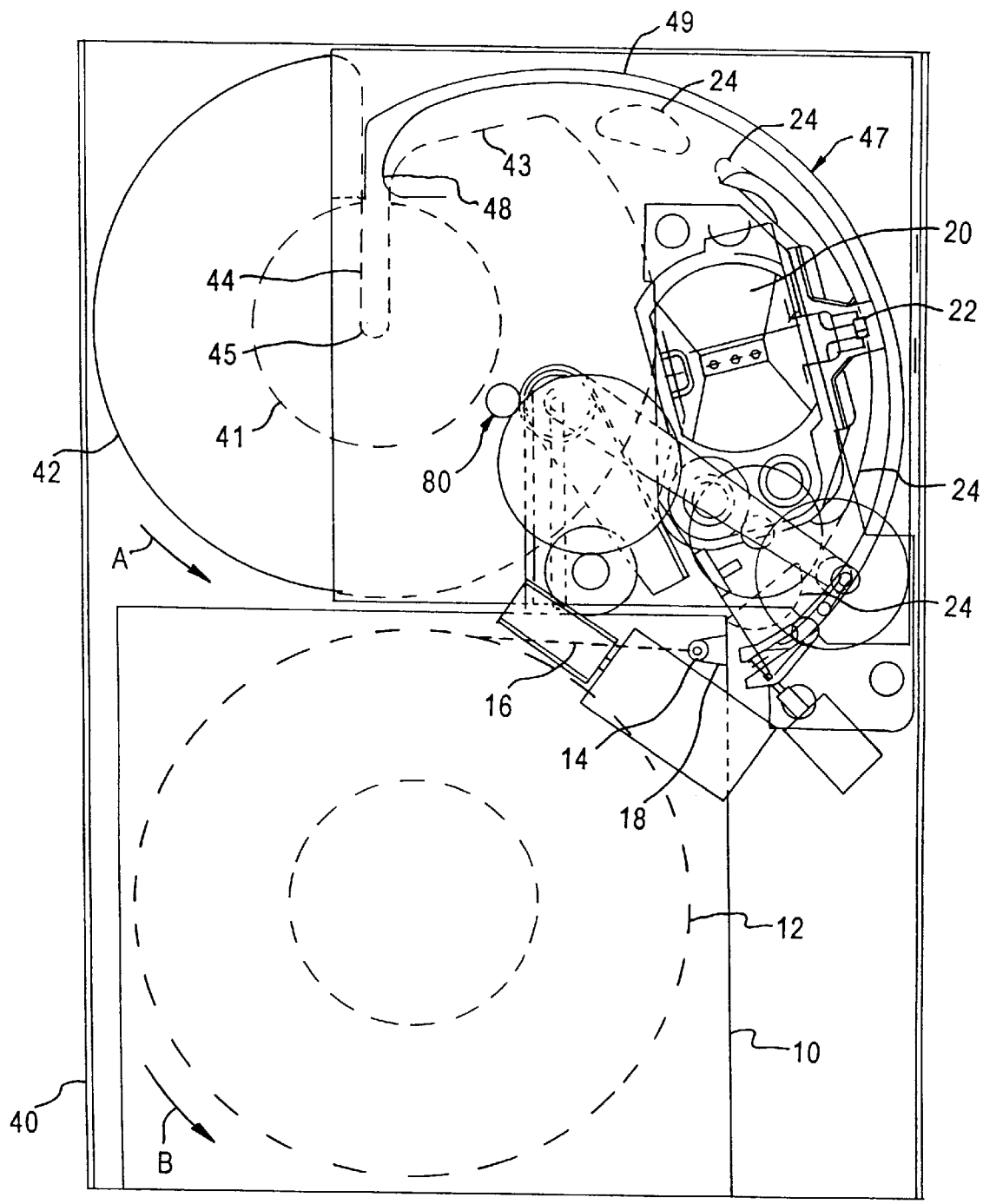
FIG. 1 schematically depicts a tape drive loading mechanism according to a first embodiment of the present invention with a load arm and a hub filler in a start position and a tape cartridge in an unloaded state.

An exemplary first embodiment of a tape drive loading mechanism of the present invention, depicted in FIG. 1, is housed within a transport cabinet 40. The transport cabinet 40 has a loading door (not depicted) which receives a tape cartridge 10. For clarity, the loading door and a tape cartridge loading and unloading mechanism used to receive and position the tape cartridge 10 within the transport cabinet 40 are not depicted in the figures. Such a mechanism may be of conventional design, for example. Once the tape cartridge 10 is situated within the transport cabinet 40, the tape cartridge 10 is held in a fixed position within the transport cabinet 40 until its ejection from the transport cabinet 40.

Figure 14:
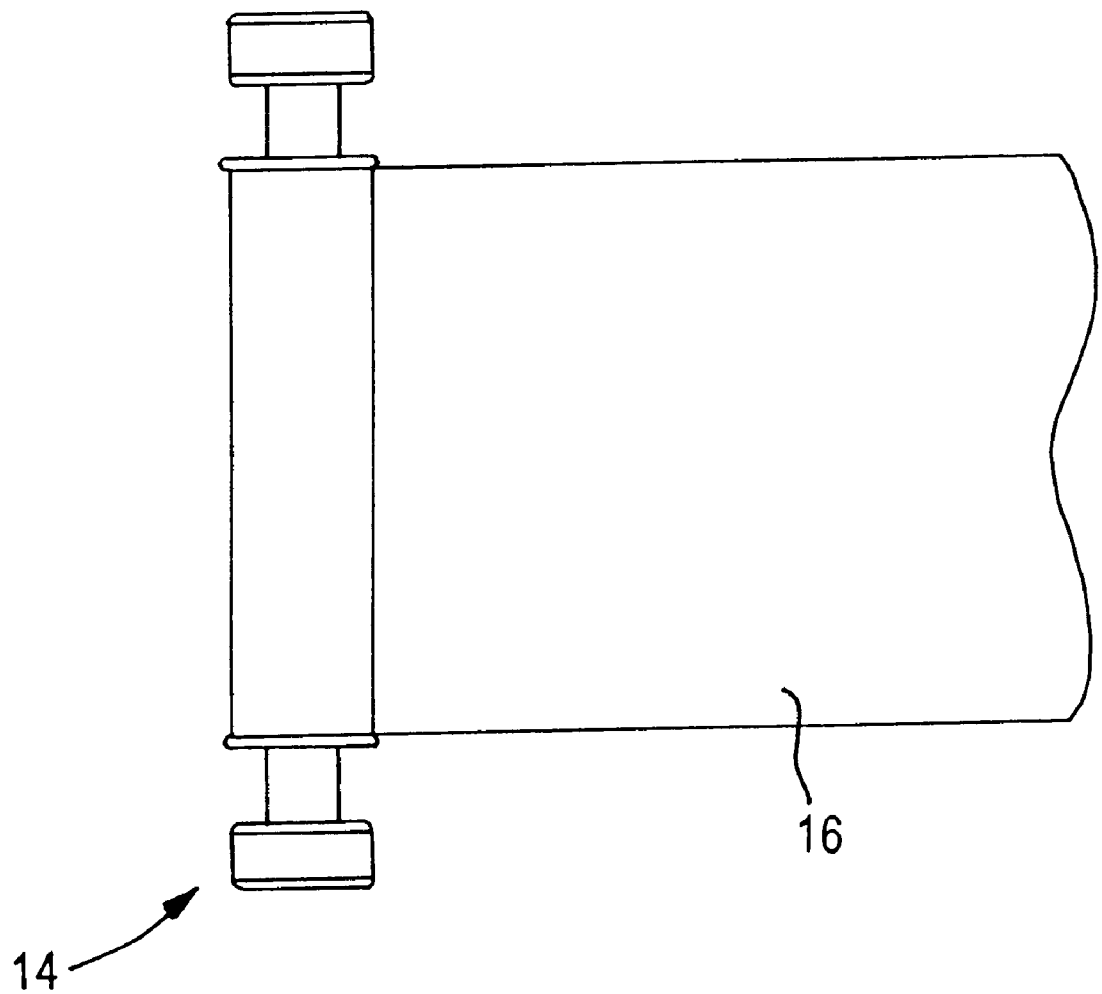
FIG. 14 depicts an embodiment of a leader pin for use with the present invention.

The present invention depicted in FIG. 1 is configured to operate with a tape cartridge 10 having a single reel 12 mounted such that the reel 12 may rotate therein. The tape 16 is wound around the center of the reel 12 and a leader pin 14 is attached to the terminal end of the tape 16, as depicted in FIG. 14. The leader pin 14 is configured in the shape of a spool with the terminal end of the tape 16 attached to the narrow center portion of the spool. The tape cartridge 10 includes a recessed portion 18 in which the leader pin 14 rests when the tape 16 is fully wrapped around the reel 12 and therefore in the unloaded state, as in FIG. 1. The tape 16 runs through an opening slot (not shown) in the recessed portion 18.

The transport cabinet 40 also houses a head assembly 20 capable of reading information from the tape 16 and writing information to the tape 16. In exemplary embodiments of the invention, the head assembly 20 is conventional in design. Although the head assembly 20 is depicted in FIGS. 1 and 8, the head assembly 20 is omitted from FIGS. 2–7 and 9–13 for clarity. The reel 12, a take-up reel 42, a head 22, and a plurality of tape guides 24 (described more fully below) are oriented at a common elevation within the transport cabinet 40.

Once in the loaded state, a motor (not shown) positioned below the take-up reel 42 rotates the take-up reel 42 in a counterclockwise direction (Arrow A as viewed in FIG. 1) in order to cause transfer of the tape 16 from reel 12 to reel 42. A motor (not shown) positioned below reel 12 is capable of engaging reel 12 to rotate reel 12 in a counterclockwise direction (Arrow B as viewed in FIG. 1) in order to transfer the tape 16 from reel 42 to reel 12.

Figure 2:
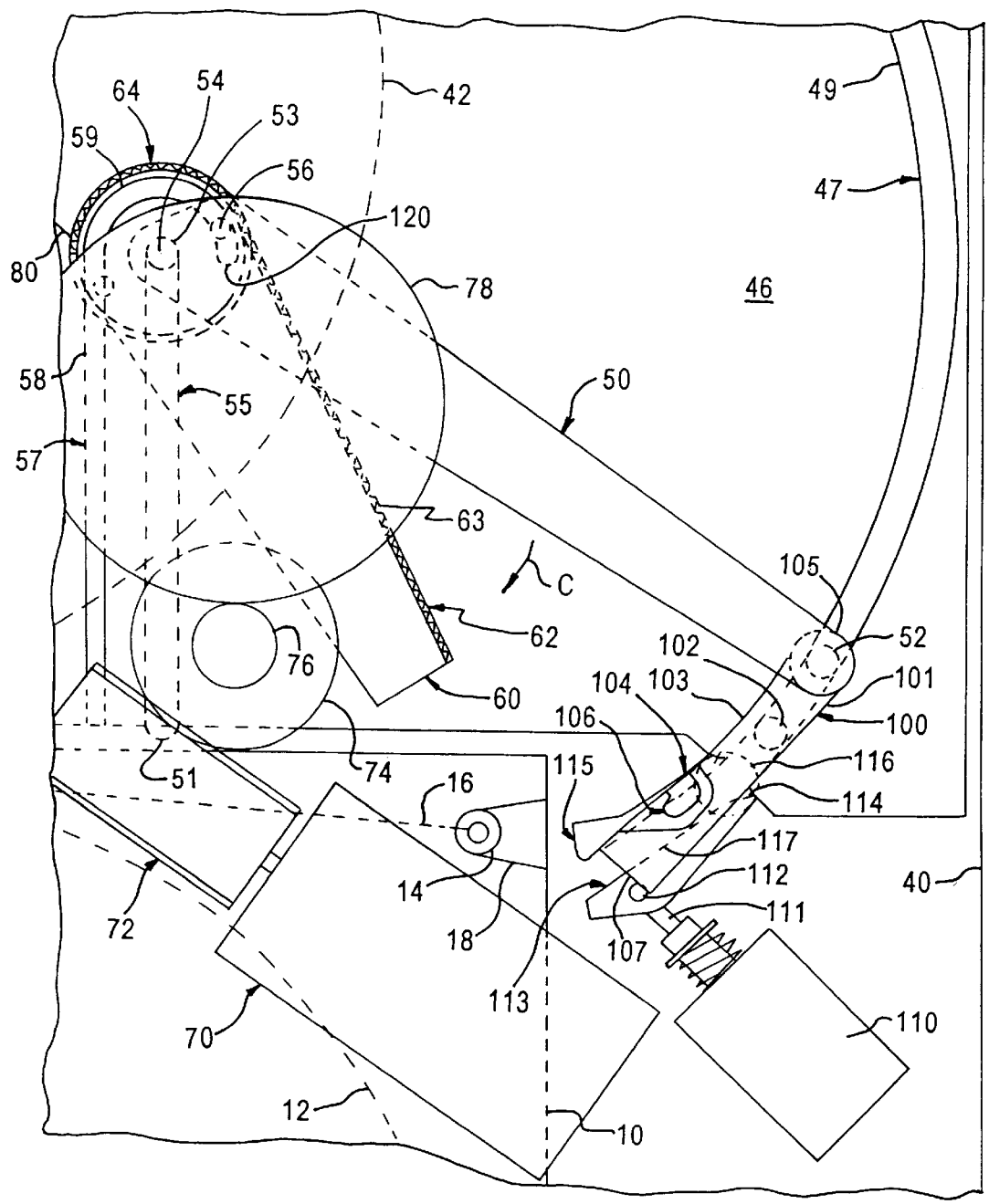
FIG. 2 is an enlarged view of a portion of a tape drive loading mechanism according to a first embodiment of the present invention with the load arm and hub filler in the start position.

As seen in the detailed view of FIG. 2, the tape drive loading mechanism according to a first embodiment of the present invention includes a load member with an elongated first portion or load arm 50 and a second portion or load gear arm 60. The tape drive loading mechanism further includes a first guide track 47, a second guide track or center track 55, a third guide track 113, a second member or hub filler 100, a motive element such as a linear solenoid 110, a fourth guide track 57, and a motive element such as first drive motor 70.

The load arm 50 has an elongated shape. The load arm 50 is oriented in a horizontal position and rigidly attached to a vertically oriented first pin or center pin 54 at one end thereof and a vertically oriented second pin 52 at the opposite end thereof. The center pin 54 extends within the center track 55 and is rotatable and translatable therein. When the tape drive loading mechanism is in the unloaded state, as depicted in FIGS. 1 and 2, the center pin 54 is located at a first end 53 of the center track 55. The load arm 50 is rigidly attached to a vertically oriented radial pin 56 that extends within the fourth guide track 57 and is rotatable and translatable therein.

The center track 55 is linearly shaped and is generally constructed by forming a slot through a planar member 46. The fourth guide track 57 has a linear portion 58 and an arcuate portion 59 and is also constructed by forming a slot through the planar member 46. The linear portion 58 of the fourth guide track 57 is parallel to the center track 55. The linear portion 58 of the fourth guide track 57 is spaced apart from the center track 55 by a distance substantially equal to the distance between the center pin 54 and the radial pin 56. The arcuate portion 59 of the fourth guide track 57 has a constant radius of curvature substantially equal to the distance between the center pin 54 and the radial pin 56.

The load gear arm 60 has a generally elongated shape and is oriented in a horizontal position. The load gear arm 60 is rigidly attached to the center pin 54 and to the radial pin 56, and thereby rigidly attached to the load arm 50. The load arm 50 and the load gear arm 60 lie in different elevations. The load gear arm 60 has gear teeth 62 extending outward along a linear side portion 63. In the first embodiment, the linear side portion 63 extends approximately thirty-six millimeters, but this is exemplary only. The gear teeth 62 also extend along an arcuate portion 64 over an arc of approximately 180°. The arcuate portion 64 has a constant radius of curvature.

The hub filler 100 is an elongated member having a profile with one long side 101 that is straight and an opposing long side 103 that is generally arcuately shaped. One short side 105 of the hub filler 100 is attached to the load arm 50 at the second pin 52, while the opposing short side 107 is slightly arcuately shaped. The hub filler 100 is rotatable about the second pin 52. A slot 104 of the hub filler 100 receives the tape leader pin 14 located on long side 103 at approximately ⅔ the length of the hub filler 100 away from the second pin 52. The slot 104 includes a recessed portion 106 that extends towards short side 107. The recessed portion 106 is large enough for the leader pin 14 to fit therein. The recessed portion 106 prevents the leader pin 14 from sliding out of the slot 104 during motion of the hub filler 100.

The hub filler 100 has a vertically oriented guide pin 102 attached thereto located at approximately ⅓ the length of the hub filler 100 away from the second pin 52. The guide pin 102 has a portion that extends above the hub filler 100 and is capable of extending within the first guide track 47 when the hub filler 100 is positioned below the first guide track 47. The guide pin 102 has a portion that extends below the hub filler 100 and is capable of extending within the third guide track 113 when the hub filler 100 is positioned over the third guide track 113.

The first guide track 47 has a linear portion 48 (see FIG. 1) and an arcuate portion 49 and is constructed by forming a slot through the planar member 46. The planar member 46 is arranged in a plane between the hub filler 100 and the load arm 50. The linear portion 48 of the first guide track 47 is parallel to the center track 55. The arcuate portion 49 has a radius of curvature equal to the distance between the center pin 54 and the second pin 52. The linear portion 48 of the first guide track 47 extends to a position adjacent to a radial channel 44 in take-up reel 42 for receiving the hub filler 100 and the tape leader pin 14.

As seen in FIG. 2, the automatic tape loading mechanism includes a third guide track 113 that has a slot 117. The third guide track 113 has a first end 114 located adjacent a terminal end of the first guide track 47. A first end of the third guide track 113 is mounted on an upper terminal end of a third pin 116. The third guide track 113 rotates about the third pin 116. The lower portion of the guide pin 102 extends below the hub filler 100 and into the third guide track 113 when the hub filler 100 is positioned over the third guide track 113.

Figure 3:
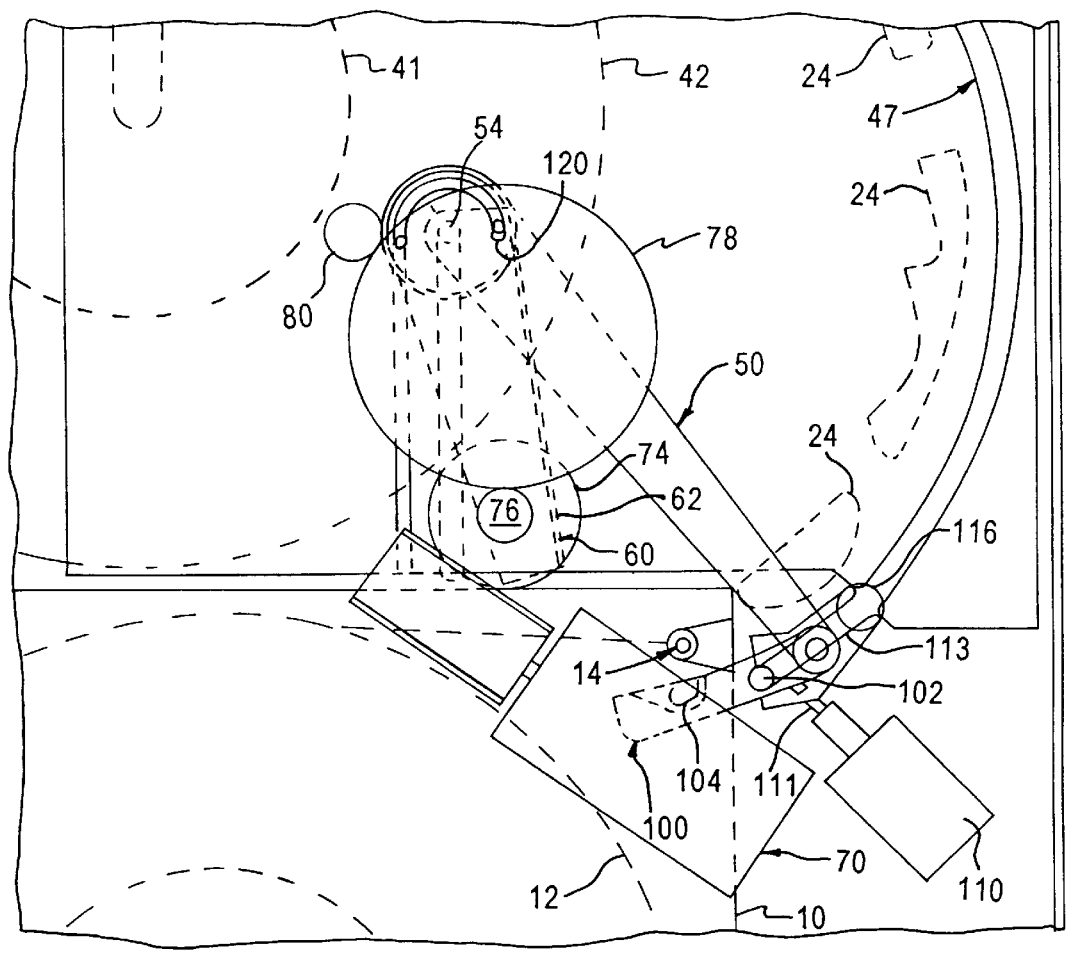
FIG. 3 is an enlarged view of a tape drive loading mechanism according to a first embodiment of the present invention with the hub filler positioned within the tape cartridge adjacent the leader pin.

The solenoid 110 is mounted to the transport cabinet 40 and includes an extensible member 111 connected to the third guide track 113 near the second end 115 by pin 112. The solenoid 110 operates in a conventional manner and therefore is not described herein in detail. The solenoid 110 uses the extensible member 111 to force the third guide track 113 to rotate about the third pin 116. The extensible member 111 of the solenoid 110 is extended when the guide pin 102 of the hub filler 100 is located near the second end 115 of the third guide track 113, as depicted in FIG. 3. The extensible member 111 of the solenoid 110 is used to rotate the third guide track 113 about the third pin 116, thereby pushing the guide pin 102 and forcing the hub filler 100 to rotate about the second pin 52. This movement will be shown in later Figures.

The illustrated exemplary first embodiment of the present invention includes a first drive motor 70 driving a plurality of interconnecting gears including a worm 72 having teeth which are engaged to a mating worm gear 74. Worm gear 74 transfers the motion from worm 72 to gear 76 that is rigidly connected to worm gear 74. Gear 76 is a spur gear having teeth that are engaged with teeth on spur gear 78, which are engaged to the teeth on spur gear 80. Gear 80 has teeth that are engaged to the gear teeth 62 on the load gear arm 60. The plurality of interconnected gears allow the first drive motor 70 to force the load gear arm 60 and the load arm 50 to rotate and translate on the center pin 54 within the center track 55. The motion of the load gear arm 60 and connected load arm 50 can be controlled by the direction and amount of rotation of the worm 72 caused by the motor 70 that includes an encoder.

Figure 12:
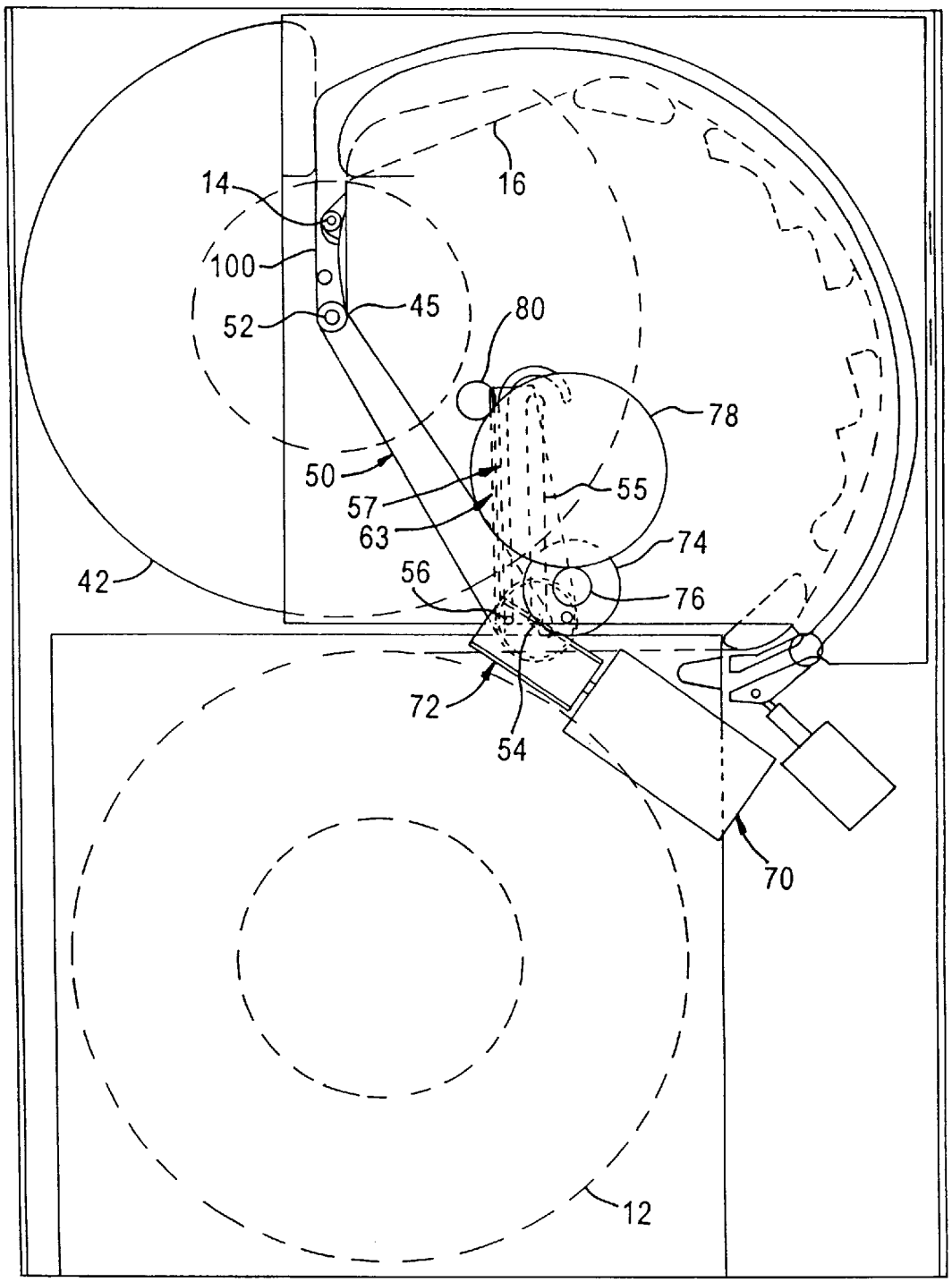
FIG. 12 depicts a tape drive loading mechanism according to a first embodiment of the present invention with the load arm and the hub filler in an end position and the tape cartridge in a loaded state.
Figure 13:
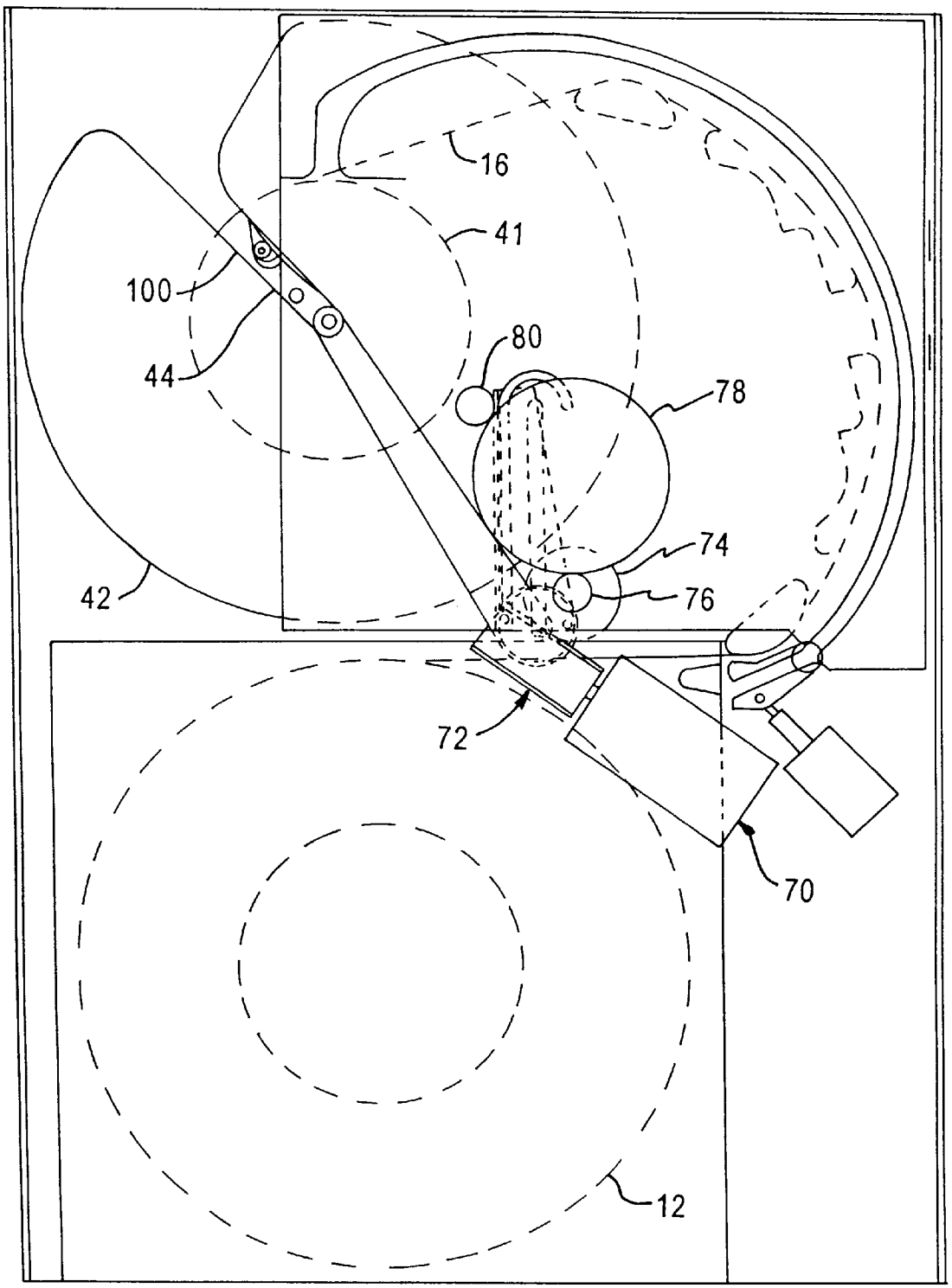
FIG. 13 depicts a tape drive loading mechanism according to a first embodiment of the present invention with the load arm and the hub filler in the end position and a take-up reel rotated in a counterclockwise direction from its position in FIG. 12.

FIGS. 1–13 depict the tape drive loading mechanism at various positions as it brings the tape cartridge 10 from the unloaded state to the loaded state. FIGS. 1 and 2 depict the load arm 50 and the load gear arm 60 in the start position, and the tape cartridge 10 in the unloaded state. FIGS. 12 and 13 depict the load arm 50 and the load gear arm 60 in the end position, and the tape cartridge in the loaded state. As will be more fully discussed later, in order to move the tape drive loading mechanism of the present invention from the loaded state to the unloaded state, the process is reversed.

Referring to FIGS. 1 and 2, in the start position the load arm 50 is positioned so the hub filler 100 is located outside but near the tape cartridge 10 and the guide pin 102 is positioned within the arcuate portion 49 of the first guide track 47. The hub filler 100 should not interfere with the loading and unloading of the tape cartridge 10 from the transport cabinet 40 when the tape drive loading mechanism is in the start position. The extensible member 111 of the solenoid 110 is in the retracted position when the tape drive loading mechanism is in the start position. The tape cartridge 10 is in the unloaded state wherein the leader pin 14 rests within the recessed portion 18 and the tape 16 is fully wrapped around the reel 12.

The motor 70 is then activated such that it causes, through the gear assembly's connection with the gear teeth 62, the clockwise rotation of the load gear arm 60 in the direction of arrow C. The clockwise rotation of the load gear arm 60 about the center pin 54 causes the clockwise rotation of the load arm 50. The clockwise rotation of the load arm 50 forces the hub filler 100 to move and the guide pin 102 to translate along the first guide track 47 to the third guide track 113. The location of the first end 114 of the third guide track 113 directly below the terminal end of the first guide track 47 ensures that the guide pin 102 will slide smoothly from the first guide track 47 into the third guide track 113, and vice versa. As the load arm 50 rotates in a clockwise direction and the guide pin 102 is forced towards a second end 115 of the third guide track 113, the radial pin 56 will hit a terminal end 120 of the fourth guide track 57. The contact between the terminal end 120 of the fourth guide track 57 and the radial pin 56 will prevent the load arm 50 from rotating to a point at which the guide pin 102 extends beyond the second end 115 of the third guide track 113.

FIG. 3 depicts the hub filler 100 positioned adjacent the leader pin 14. This position represents the furthest clockwise rotation of the load gear arm 60 and the load arm 50.

Figure 4:
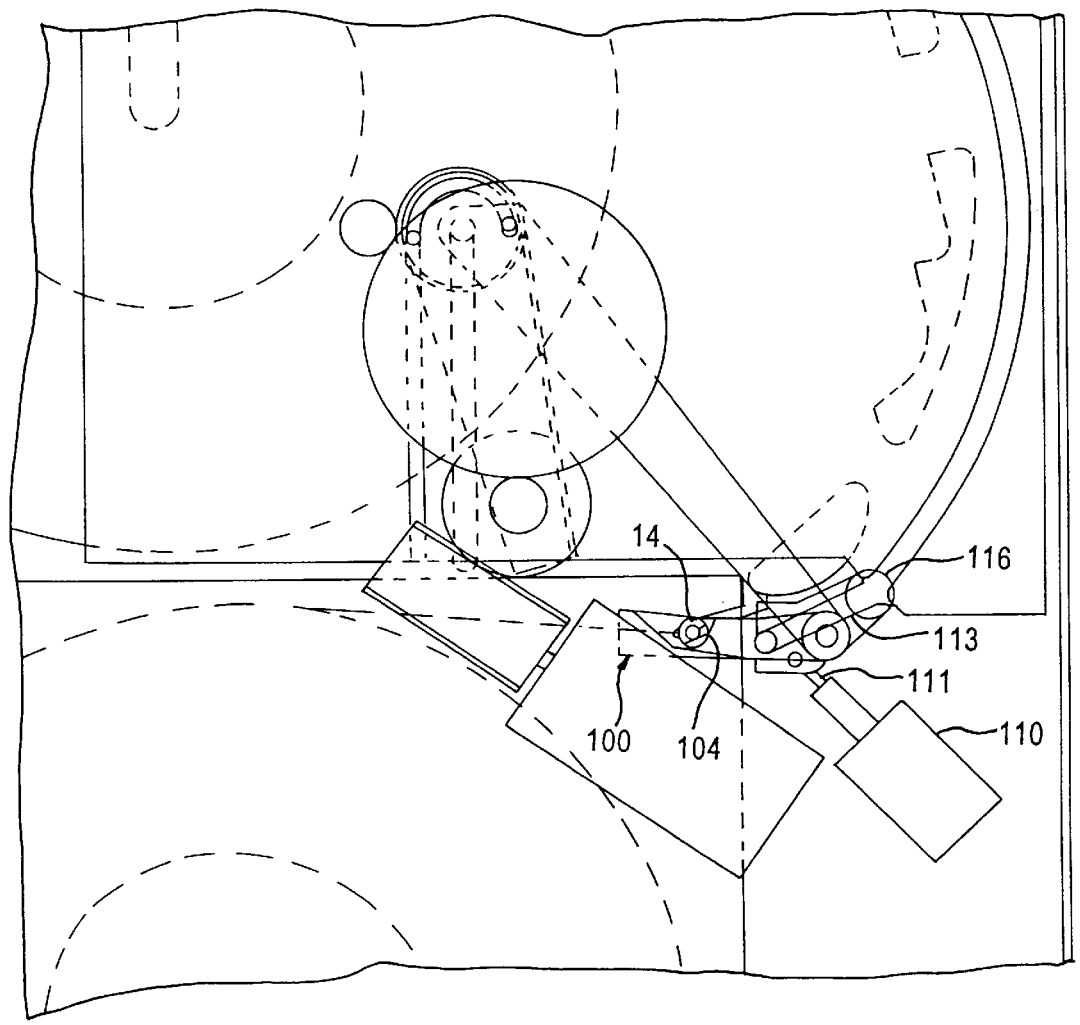
FIG. 4 is an enlarged view of a tape drive loading mechanism according to a first embodiment of the present invention depicting the slot of the hub filler in contact with the leader pin.

Once the load gear arm 60 and the load arm 50 are in their furthest clockwise rotation, the movement of the extensible member 111 of the solenoid 110 extends which causes the third guide track 113 to rotate in a clockwise direction about the third pin 116. The clockwise rotation of the third guide track 113 pushes the guide pin 102, thereby forcing the hub filler 100 to rotate in a clockwise direction about the second pin 52 to a position as depicted in FIG. 4. In this position the leader pin 14 is positioned within the slot 104 of the hub filler 100. The hub filler 100 is rotated by the movement of the extensible member 111 of the solenoid 110 from the retracted position, as depicted in FIGS. 1–3, to the extended position, as depicted in FIG. 4. The extensible member 111 of the solenoid 110 remains in the extended position until the leader pin 14 is unloaded.

Figure 5:
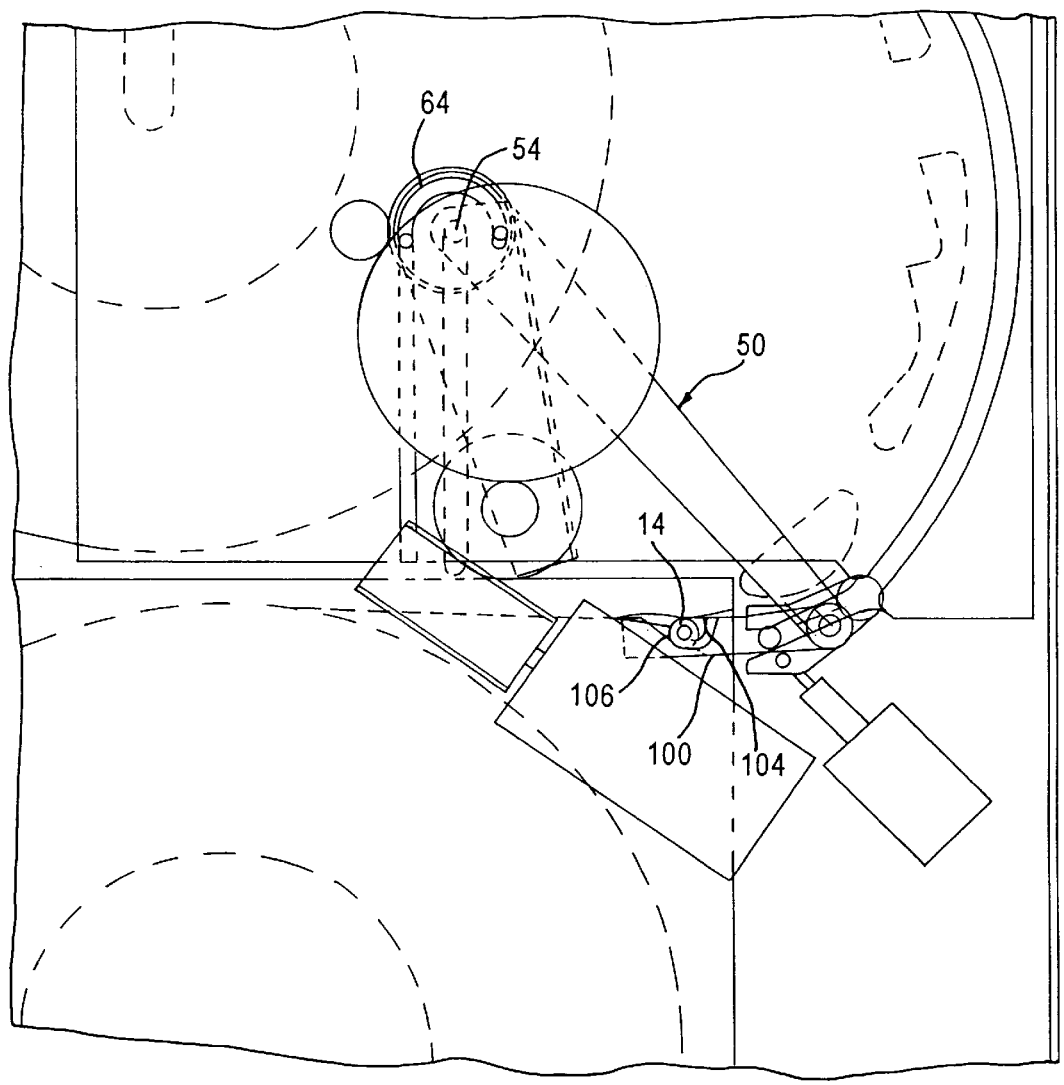
FIG. 5 is an enlarged view of a tape drive loading mechanism according to a first embodiment of the present invention depicting the leader pin positioned within a recessed portion of the hub filler.

Once the leader pin 14 is within the slot 104 on the hub filler 100, the motor 70 is used to slightly rotate the load arm 50 in a counterclockwise direction about the center pin 54 to a position depicted in FIG. 5. In this position the leader pin 14 is positioned within the recessed portion 106 of the hub filler 100 to prevent the leader pin 14 from sliding out of the slot 104 during subsequent motion of the hub filler 100. In order to cause the counterclockwise rotation of the load arm 50, the direction of rotation of the motor 70 is reversed thereby causing the plurality of gears to rotate in reverse directions. The plurality of gears act upon the arcuate portion 64 of the gear teeth 62 of the load gear arm 60 to cause the counterclockwise rotation of the load gear arm 60 and the load arm 50.

Figure 6:
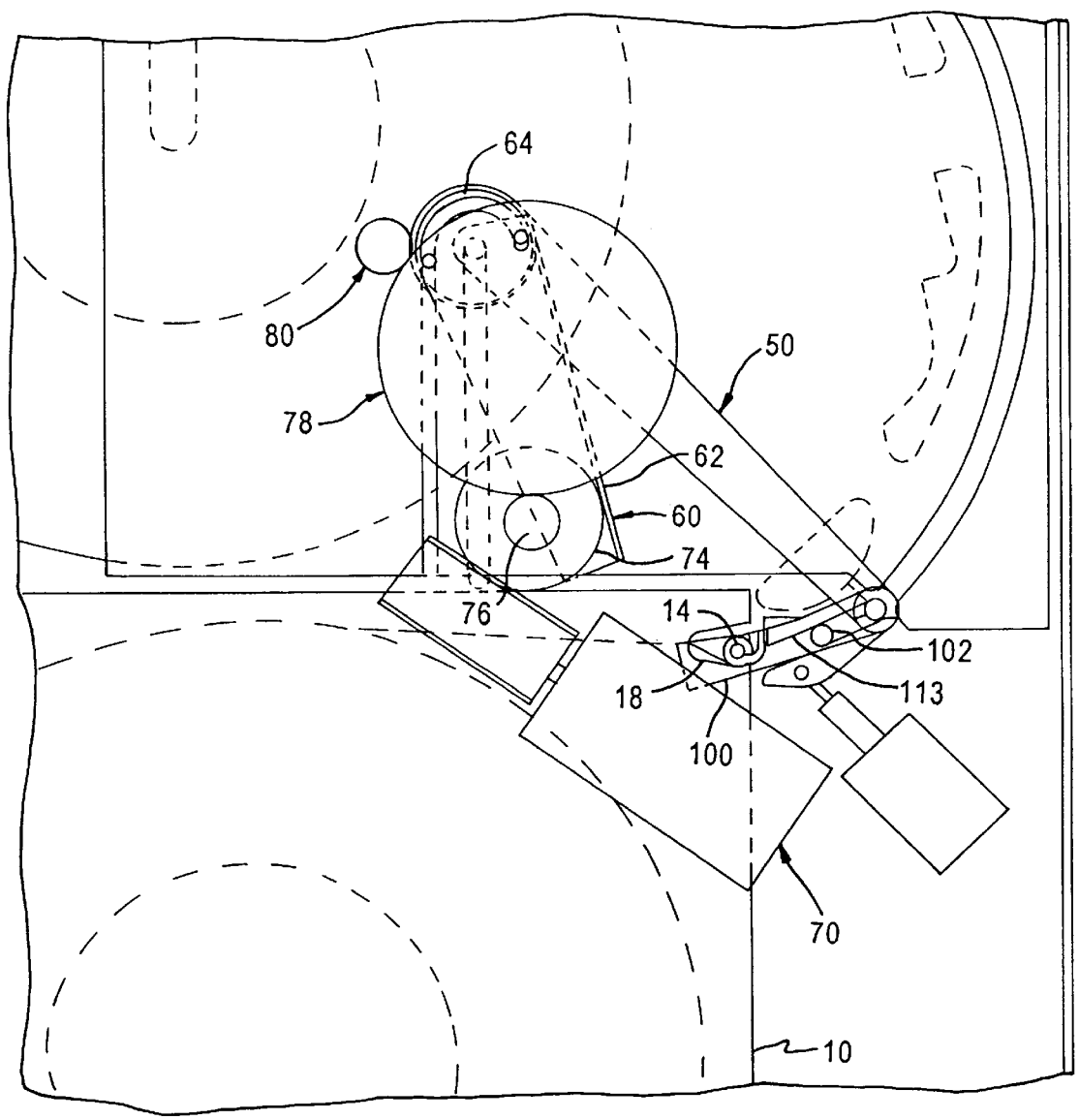
FIG. 6 is an enlarged view of a tape drive loading mechanism according to a first embodiment of the present invention with the load arm rotated in a counterclockwise direction from its position in FIG. 5 and the guide pin of the hub filler guided by the third guide track.

The motor 70 then continues to rotate the load gear arm 60 and the load arm 50 in a counterclockwise direction about the center pin 54 to a position as depicted in FIG. 6. The hub filler 100 begins to pull the leader pin 14, and thereby begins to unwind the tape 16 from the reel 12. The guide pin 102 of the hub filler 100 is being guided by the third guide track 113 towards the first guide track 47. The leader pin 14 is still within the angular mouth opening or recessed portion 18 in the tape cartridge 10.

Figure 7:
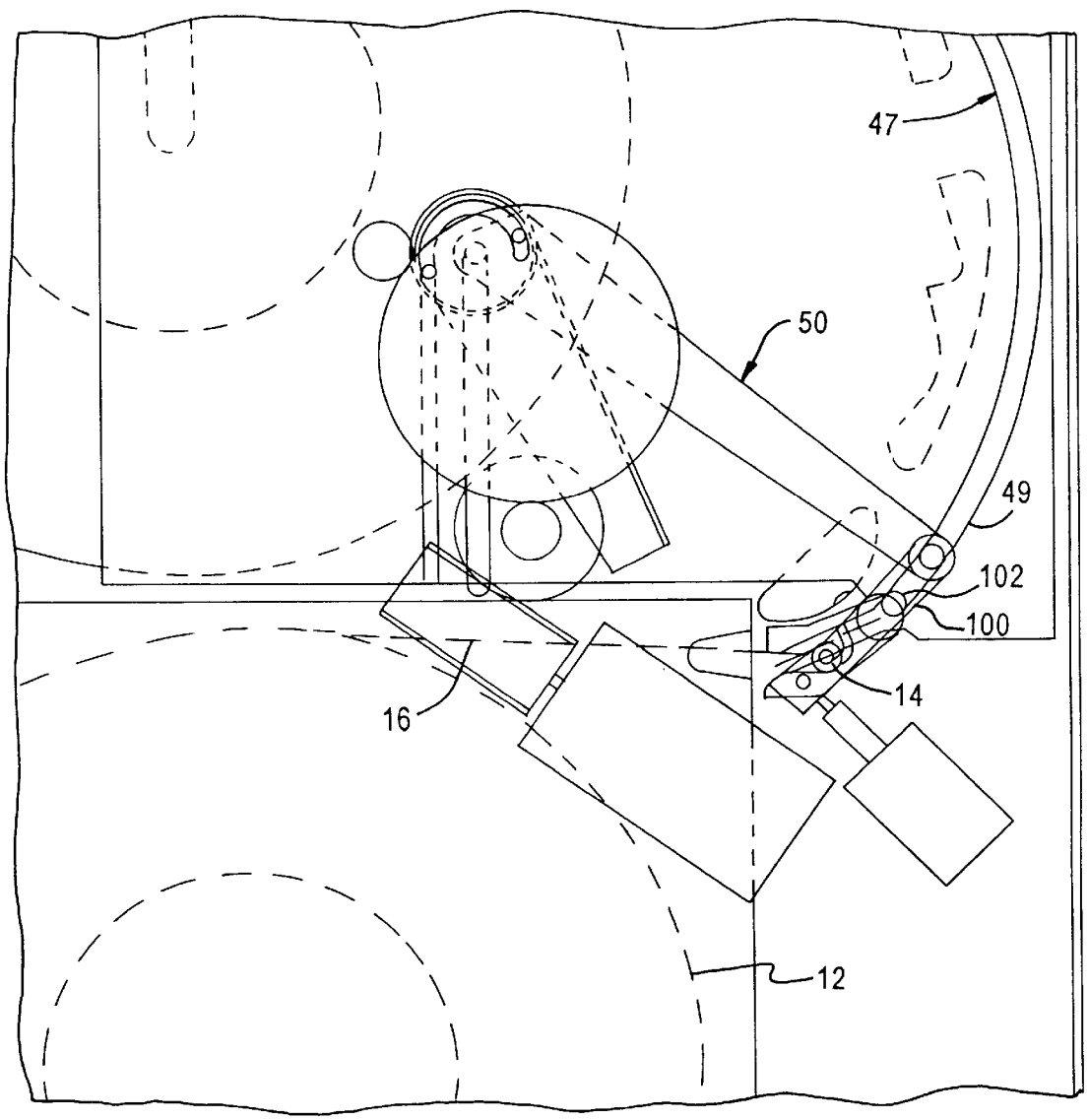
FIG. 7 is an enlarged view of a tape drive loading mechanism according to a first embodiment of the present invention with the load arm further rotated in a counterclockwise direction from its position in FIG. 6 and the guide pin of the hub filler positioned within an arcuate portion of the first guide track.
Figure 8:
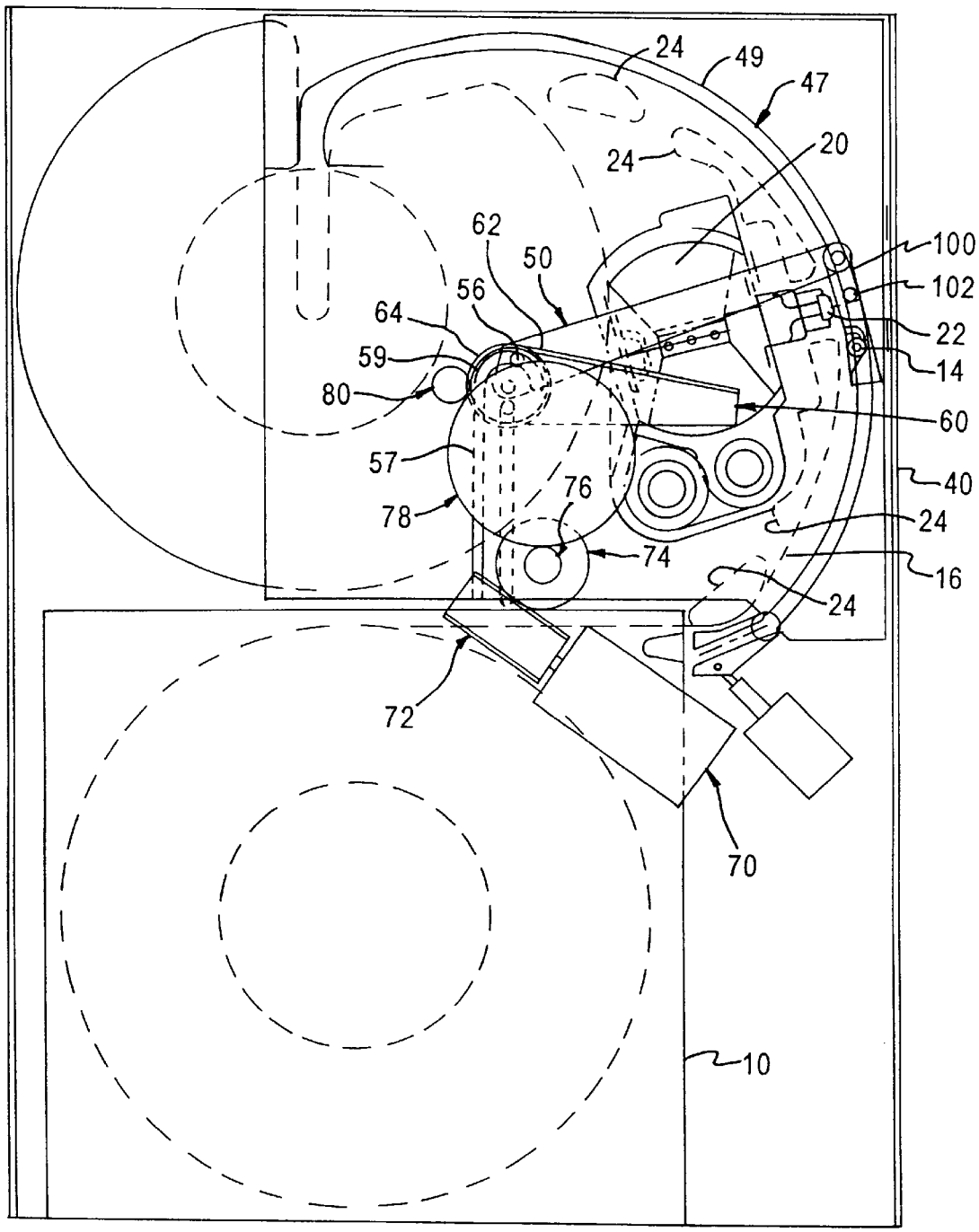
FIG. 8 depicts a tape drive loading mechanism according to a first embodiment of the present invention with the hub filler passing a head of the head assembly.

The motor 70 continues to rotate the load gear arm 60 and the load arm 50 in a counterclockwise direction about the center pin 54 to a position as depicted in FIG. 7. The load arm 50 continues to force hub filler 100 to unwind the tape 16 from the reel 12 and the leader pin 14 is pulled free from the tape cartridge 10. The guide pin 102 of the hub filler 100 is now positioned within the arcuate portion 49 of the first guide track 47.

The motor 70 continues to rotate the load gear arm 60 and the load arm 50 in a counterclockwise direction about the center pin 54 to a position as depicted in FIG. 8. The load arm 50 continues to force hub filler 100 to unwind the tape 16 from the reel 12. During the rotation of the load arm 50 and the hub filler 100, the guide pin 102 travels within the arcuate portion 49 of the first guide track 47 and the radial pin 56 travels within the arcuate portion 59 of the fourth guide track 57.

FIG. 8 depicts the hub filler 100 as it passes the head 22 of the head assembly 20. As the hub filler 100 passes the head assembly 20, there is clearance between the hub filler 100 and the head 22 and between the hub filler 100 and the side of the transport cabinet 40. The tape 16 is positioned in contact with the head 22 in order to facilitate the transfer of data between the head assembly 20 and the data storage medium or tape 16. As the hub filler 100 pulls the tape 16, the tape 16 is guided by a plurality of tape guides 24 that properly position the tape 16 against the head 22 and prevent any damage to the tape 16. The tape guides 24 are of a conventional type.

Figure 9:
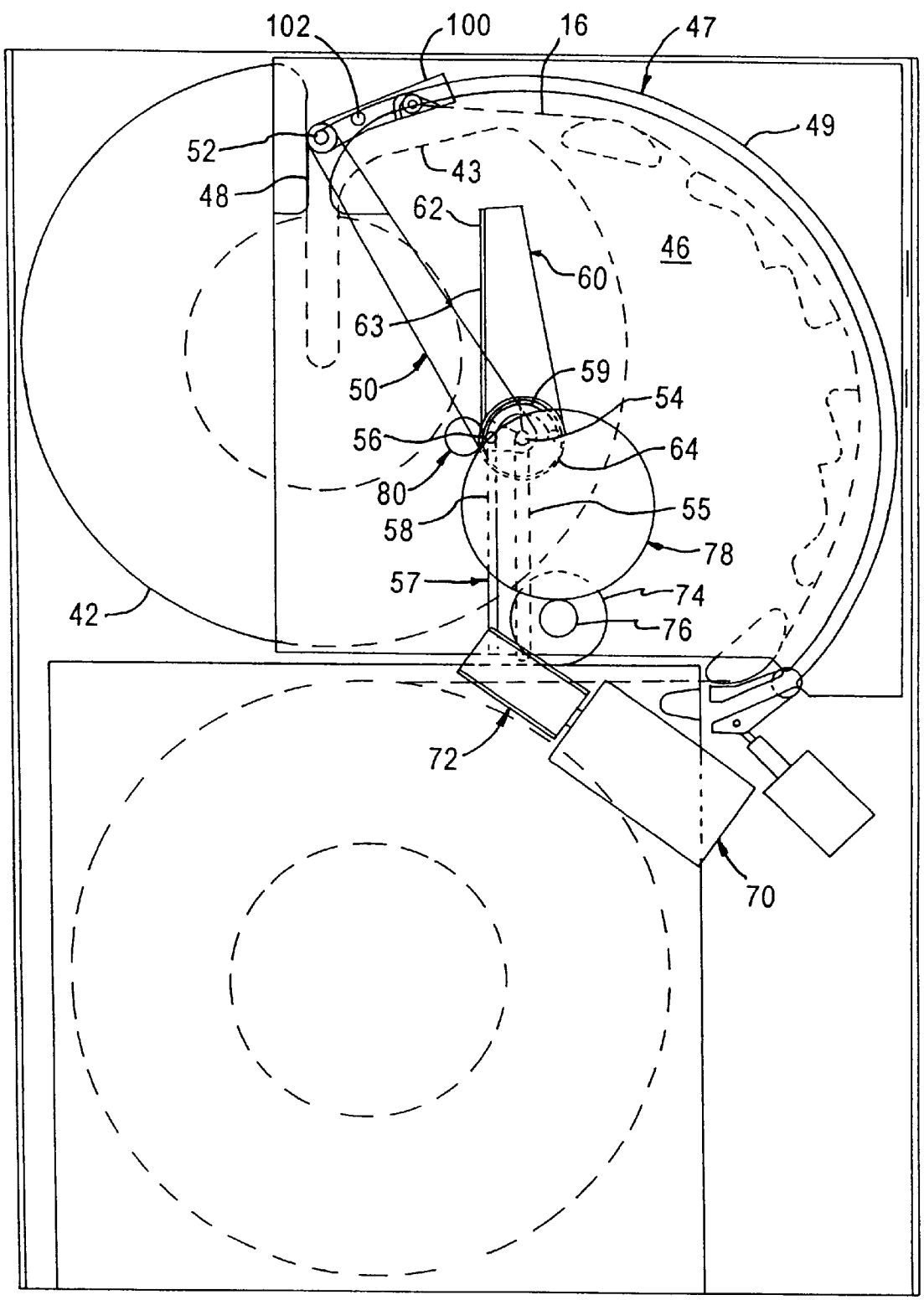
FIG. 9 depicts a tape drive loading mechanism according to a first embodiment of the present invention with the load arm at a motion switching position.

FIG. 9 depicts a position at which the load arm 50 switches from rotating counterclockwise about the center pin 54 to translating along the center track 55. This change from rotation to translation is caused by several factors. One factor is that the teeth of the spur gear 80 are engaged with the gear teeth 62 of the load gear arm 60 at the junction of the arcuate portion 64 and the linear portion 63. A second factor is that in this position the linear portion 63 of the gear teeth 62 are parallel to both the linear portion 58 of the fourth guide track 57 and the linear portion 48 of the first guide track 47. A third factor is that the radial pin 56 is positioned at the junction of the arcuate portion 59 and the linear portion 58 of the fourth guide track 57. The load gear arm 60 is no longer constrained by the radial pin 56 to pure rotation, but rather the load gear arm 60 is free to translate along the center track 55. Additionally, the load arm 50 is fully rotated in a counterclockwise direction with the second pin 52 being positioned at the junction of the arcuate portion 49 and the linear portion 48 of the first guide track 47. A notched portion 43 is cut in the take-up reel 42 to prevent interference between the second pin 52 and the planar member 46 and interference between the guide pin 102 and the planar member 46 at this position.

From the position in FIG. 9, the motor 70 continues to rotate in the same direction as it rotated to cause a counterclockwise rotation of the load gear arm 60. In the position depicted in FIG. 10, however, the plurality of gears are engaged with the gear teeth 62 along the linear portion 63 of the load gear arm 60, thereby causing a linear translation of the load gear arm 60 along the center track 55. In this position the radial pin 56 is forced to translate within the linear portion 58 of the fourth guide track 57.

Figure 10:
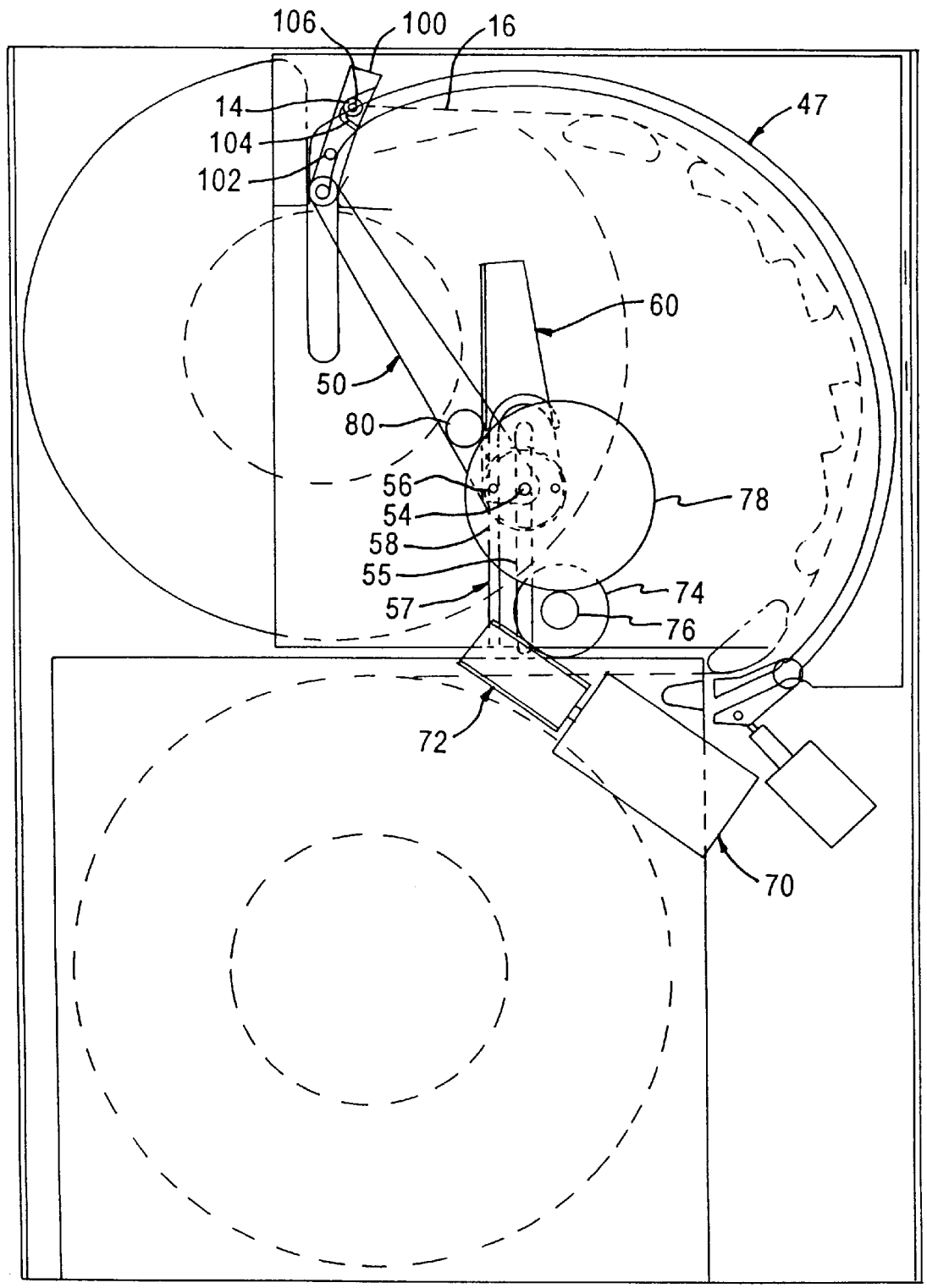
FIG. 10 depicts a tape drive loading mechanism according to a first embodiment of the present invention with the load arm and the load gear arm translating in a linear direction along the center track.

In the position depicted in FIG. 10 the recessed portion 106 of the slot 104 of the hub filler 100 serves an important function to ensure the proper operation of this embodiment of the present invention. As the hub filler 100 rotates and translates, due to the guide pin 102 extending within the first guide track 47, the recessed portion 106 acts as a lip which prevents the leader pin 14 from sliding out of the slot 104. To ensure that the leader pin 14 does not slide out of the recessed portion 106, the angle of the tape 16 extending from the leader pin 14 should not exceed approximately 90° from the long side 101.

Figure 11:
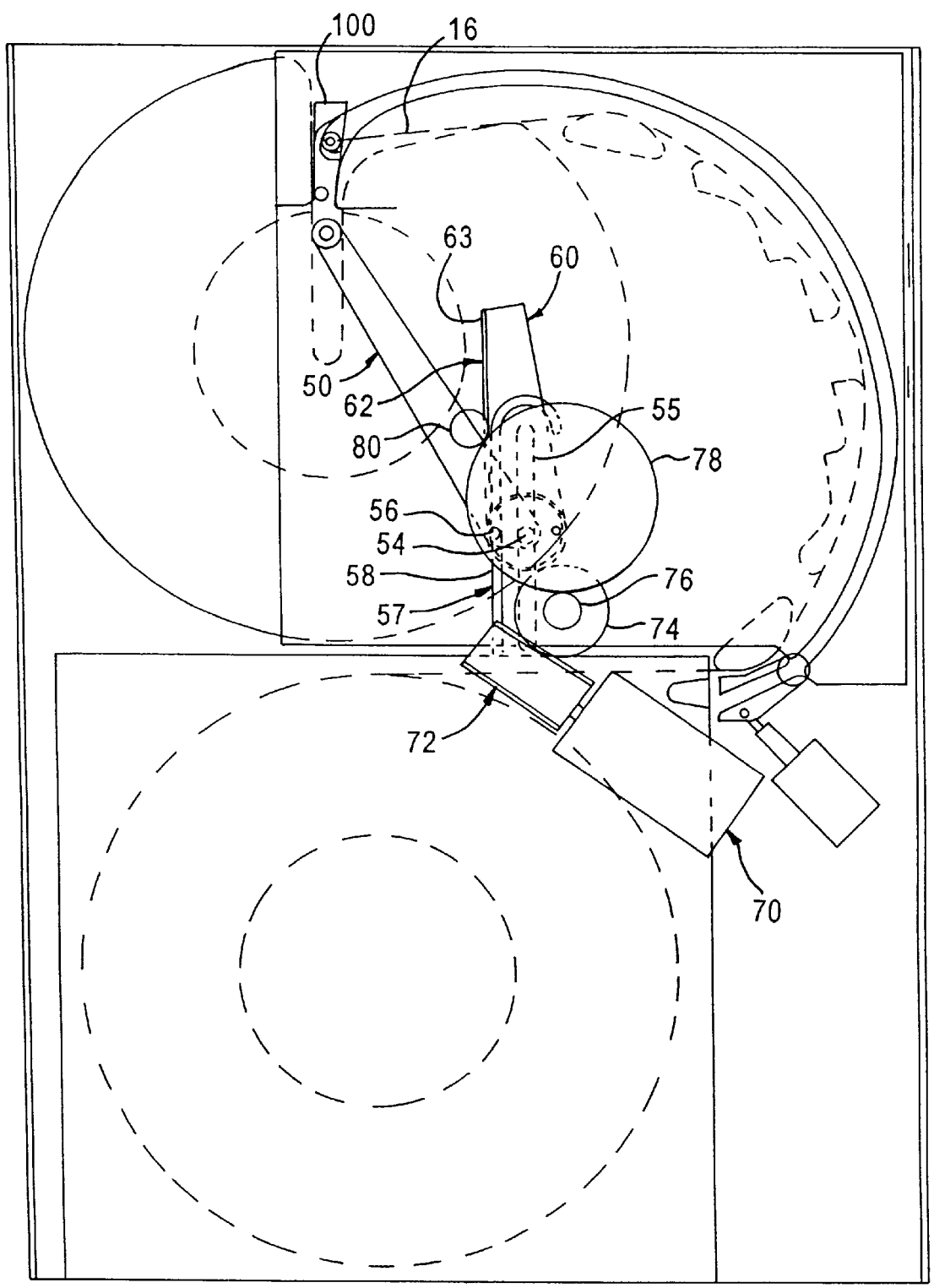
FIG. 11 depicts a tape drive loading mechanism according to a first embodiment of the present invention with the load arm and the load gear arm further translated in a linear direction along the center track from their position in FIG. 10.

The motor 70 continues to rotate in the same direction as it rotated to cause a counterclockwise rotation of the load gear arm 60, thereby causing a linear translation of the load gear arm 60 along the center track 55 to a position as depicted in FIG. 11. In this position the angle of the tape 16 extending from the leader pin 14 should not exceed approximately 90° from the long side 101.

FIG. 12 depicts the load arm 50 and the hub filler 100 in the end position and the tape cartridge 10 in the loaded state. In the end position, the second pin 52 is located at the center 45 of the take-up reel 42. The hub filler 100 is shaped and sized to fit within the channel 44 of the take-up reel 42. The radius of curvature of short side 107 is equal to the radius of curvature of the hub 41 of the take-up reel 42 so that the short side 107 sits flush with the hub 41. The load arm 50 will remain stationary in the end position until unloading of the leader pin 14.

At the position depicted in FIG. 12, the motor 70 stops rotating, and thereby discontinues the travel of the load gear arm 60 and the load arm 50 along the center track 55. The center pin 54 has reached a position near a second end 51 of the center track 55 and the radial pin 56 has reached an end of the linear portion 58 of the fourth guide track 57. The tape leader pin 14 is positioned to begin winding the tape 16 about the hub 41 of the take-up reel 42.

Once in the loaded state, the motor (not shown) positioned below reel 42 is used to rotate the take-up reel 42 in a counterclockwise direction, to a position as depicted in FIG. 13. As the take-up reel 42 rotates the tape 16 is transferred from reel 12 to take-up reel 42 and data is transferred between the tape 16 and the head assembly 20. FIG. 13 depicts the take-up reel 42 rotating in the counterclockwise direction with the tape 16 being wrapped around the hub 41 of the take-up reel 42. The hub filler 100 sits within the radial channel 44 and rotates with the take-up reel 42.

The unloading process involves reversing the above procedure. In order to return the tape 16 from reel 42 to reel 12, a motor (not shown) is positioned below reel 12 which is capable of engaging reel 12 to rotate reel 12 in a counterclockwise direction (as viewed in FIG. 13). The motor driving reel 12 forces the tape 16 to unwind from the take-up reel 42 and causes the take-up reel 42 and the hub filler 100 to rotate in a clockwise direction.

Once the take-up reel 42 reaches the position depicted in FIG. 12, the rotation of reel 12 is temporarily slowed or stopped and the motor 70 is activated. The return trip of the hub filler 100 is caused by a reversal of the direction of rotation of the motor 70 as compared to the direction of rotation of the motor 70 during loading of the hub filler 100. The motor that drives reel 12 prevents slack from forming during the return trip of the hub filler 100 and the leader pin 14 from the take-up reel 42 to the tape cartridge 10. A conventional electronic or mechanical method is used to prevent the motor driving reel 12 from rotating at a speed or with a torque that will cause the leader pin 14 to pull hard against the loading mechanism.

Once the leader pin 14 is returned to the tape cartridge 10 and the hub filler 100 is returned to the start position as depicted in FIGS. 1 and 2, the tape cartridge 10 may be removed from the transport cabinet using the loading and unloading mechanism (not shown).

Hereinafter is a description of the second and preferred embodiment of the present invention as depicted in FIGS. 15–25.

Figure 15:
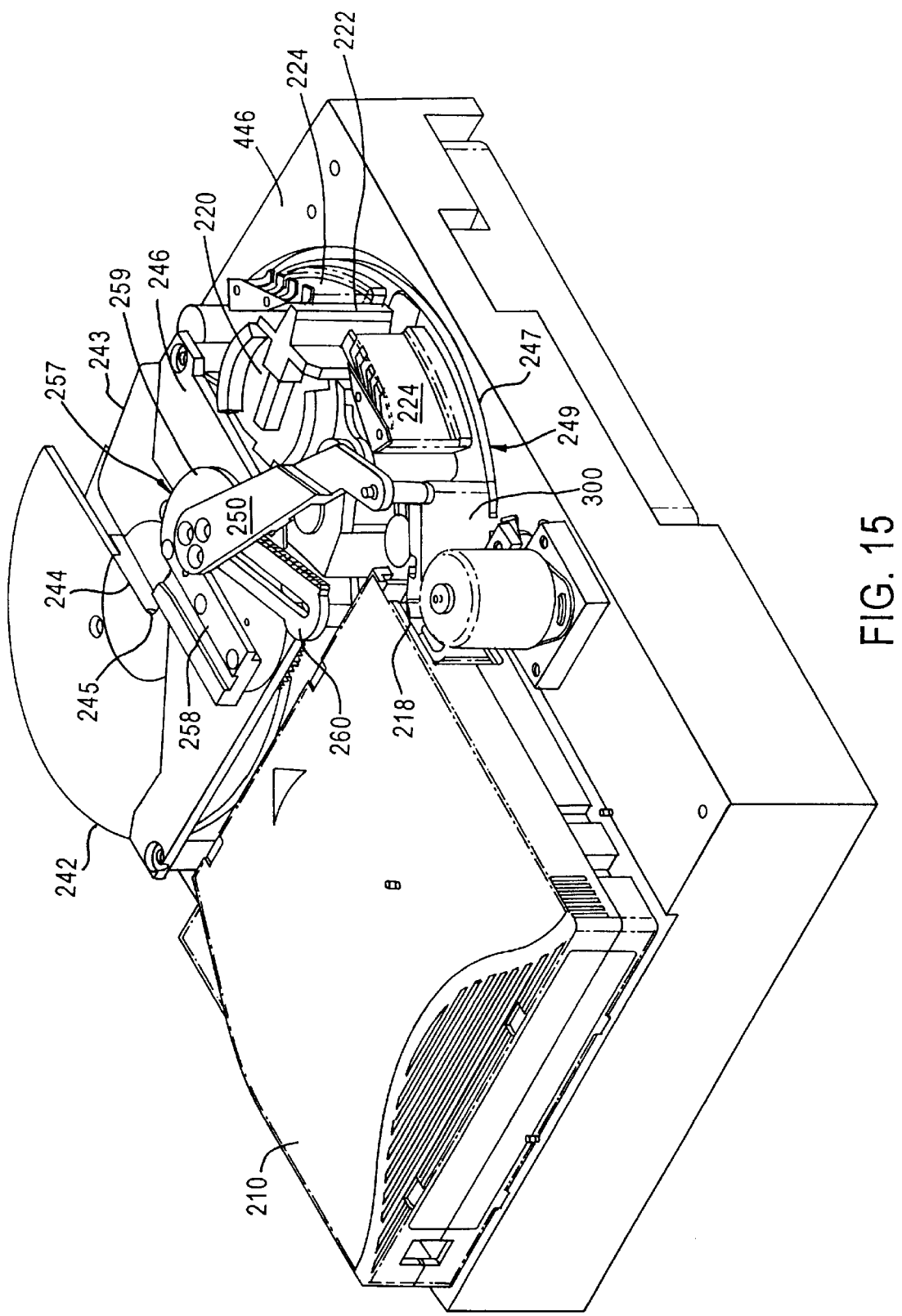
FIG. 15 depicts a perspective view of a tape drive loading mechanism according to a second, or preferred, embodiment of the present invention with a load arm and a hub filler in a start position and a tape cartridge in an unloaded state.
Figure 16:
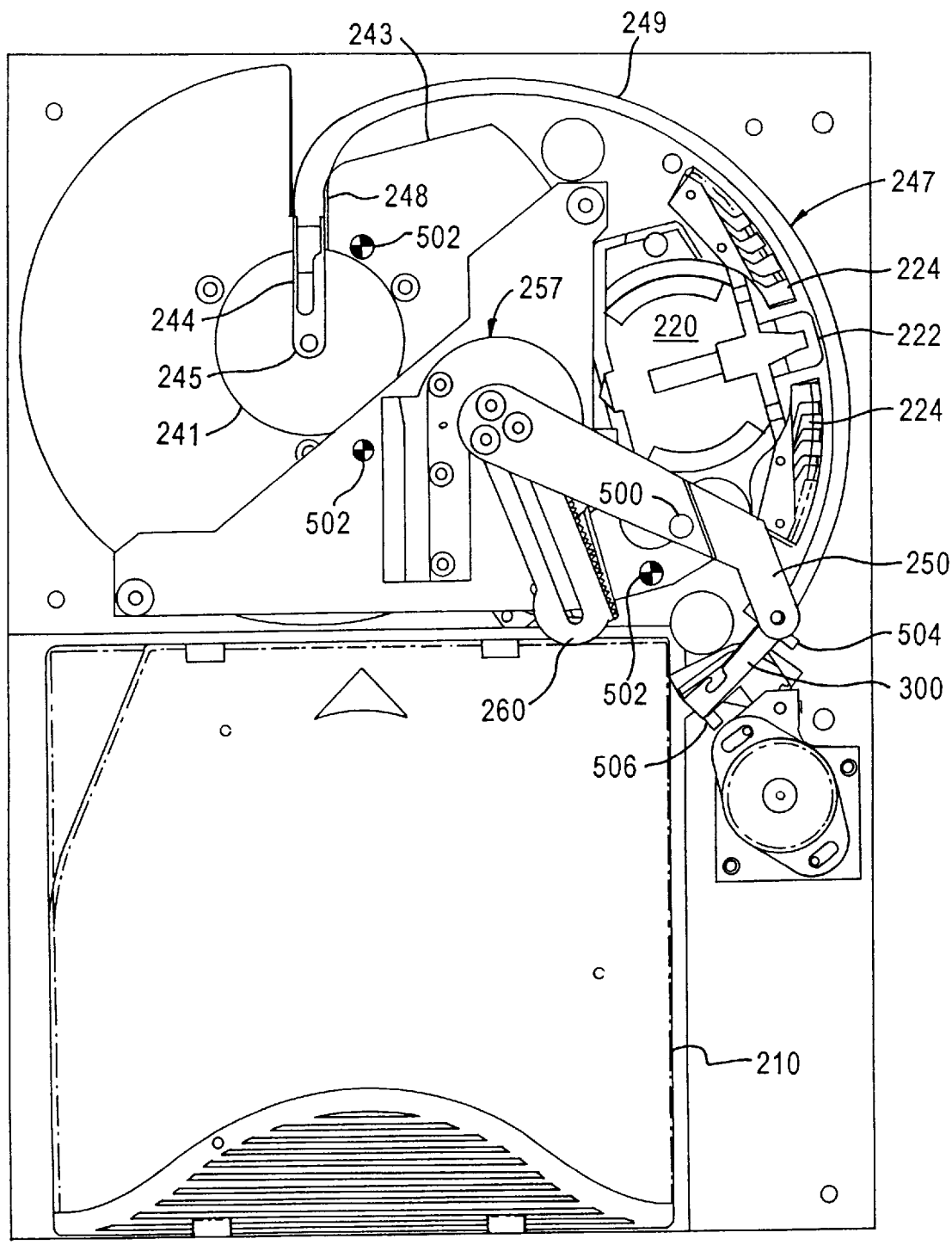
FIG. 16 depicts a top view of a tape drive loading mechanism according to a second, or preferred, embodiment of the present invention with a load arm and a hub filler in a start position and a tape cartridge in an unloaded state.

As seen in FIGS. 15 and 16, the tape drive loading mechanism according to a preferred embodiment of the present invention includes a load member with an elongated first portion or load arm 250 and a second portion or load gear arm 260. The tape drive loading mechanism further includes a first guide track 247, a second guide track 255, a third guide track 313, a second member or hub filler 300, a motive element 310, a fourth guide 257, and a motive element 270 (depicted in FIG. 23).

Figure 24:
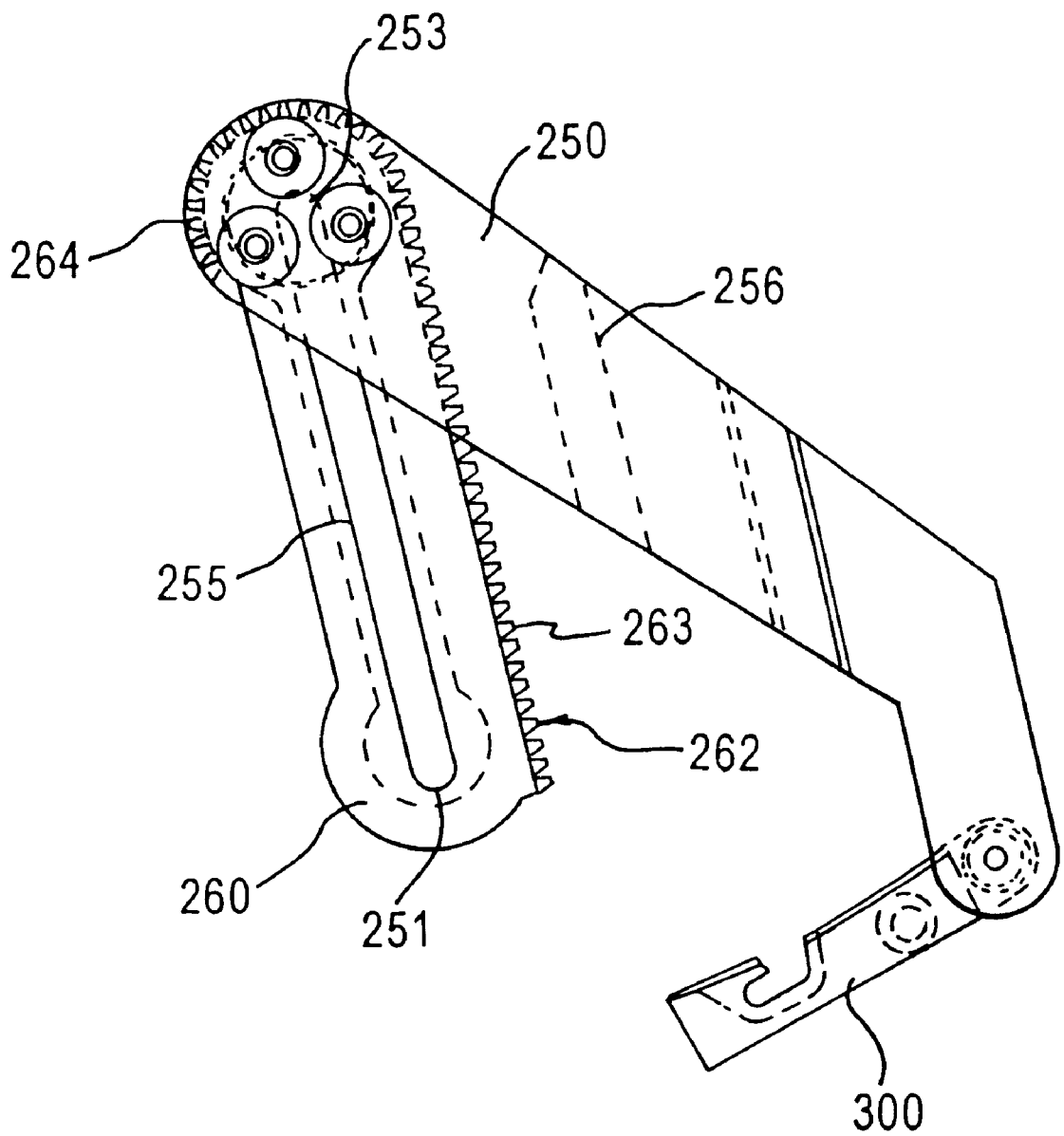
FIG. 24 is a top view of a load arm, load gear arm, and hub filler according to a second, or preferred, embodiment of the present invention with phantom lines.
Figure 25:
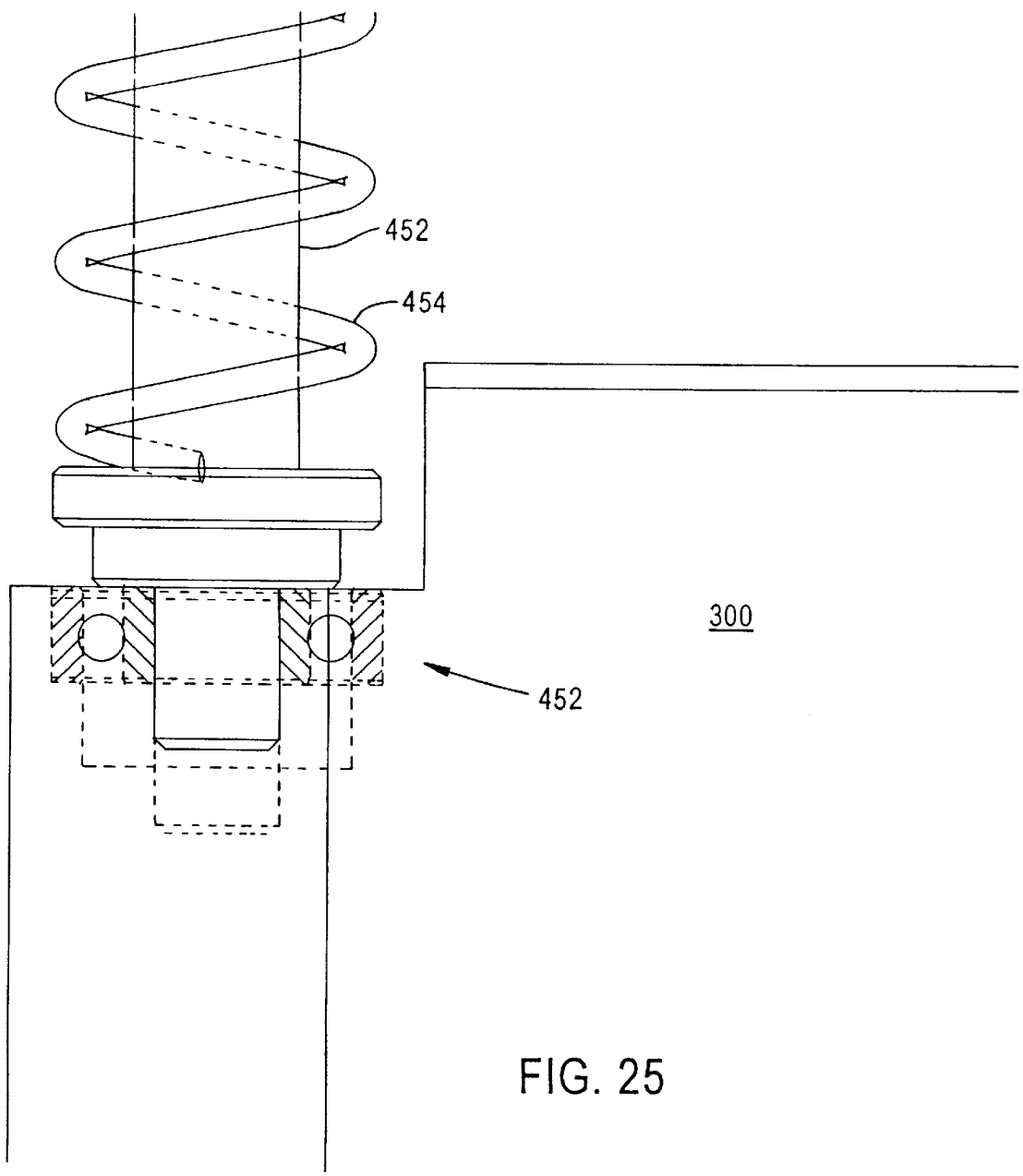
FIG. 25 is a side view of a connection between a second pin and a hub filler according to a second, or preferred, embodiment of the present invention.

Referring to FIGS. 24 and 25, the load arm 250 has an elongated shape. The load arm 250 is oriented in a horizontal position and is rotatably and translatably attached to a vertically oriented first pin or center pin 254 (depicted in FIG. 21) at one end thereof and a vertically oriented second pin 252 at the opposite end thereof. The second pin 252, as depicted in FIG. 25, is attached to the hub filler 300 by a bearing assembly 452 and is stabilized using a spring 454. The center pin 254 extends within the center track 255, which is rotatable and translatable thereabout. When the tape drive loading mechanism is in the unloaded state, as depicted in FIGS. 15 and 16, the center pin 254 is located at a first end 253 of the center track 255. The load arm 250 is rigidly attached to a vertically oriented member 256 that engages the fourth guide track 257 and is rotatable and translatable thereon.

The center track 255 is linearly shaped and is generally constructed by forming a slot through the load gear arm 260. The fourth guide track 257 has a linear portion 258 and an arcuate portion 259 and is also constructed by forming a guide mounted to the planar member 246. The linear portion 258 of the fourth guide track 257 is parallel to the center track 55. When they are in a parallel alignment, the linear portion 258 of the fourth guide track 257 is spaced apart from the center track 255 by a distance substantially equal to the distance between the center pin 254 and the offset member 256 when the center pin 254 is located at the first end 253 of the center track 255. The arcuate portion 259 of the fourth guide track 257 has a constant radius of curvature substantially equal to the distance between the center pin 254 and the offset member 256 when the center pin 254 is located at the first end 253 of the center track 255.

The load gear arm 260 has a generally elongated shape and is oriented in a horizontal position. The load gear arm 260 is rigidly attached to the load arm 250. The load arm 250 and the load gear arm 260 lie in different elevations. The load gear arm 260 has gear teeth 262 extending outward along a linear side portion 263. In the second and preferred embodiment, the linear side portion 263 extends approximately thirty-six millimeters, but this is exemplary only. The gear teeth 262 also extend along an arcuate portion 264 over an arc of approximately 180°. The arcuate portion 264 has a constant radius of curvature.

The hub filler 300 is an elongated member having a profile with one long side 301 that is straight and an opposing long side 303 that is generally arcuately shaped. One short side 305 of the hub filler 300 is attached to the load arm 250 at the second pin 252, while the opposing short side 307 is slightly arcuately shaped. The hub filler 300 is rotatable about the second pin 252. A slot 304 of the hub filler 300 receives the tape leader pin 214 located on long side 303 at approximately ⅔ the length of the hub filler 300 away from the second pin 252. The slot 304 includes a recessed portion 306 that extends towards short side 307. The recessed portion 106 is large enough for the leader pin 214 to fit therein. The recessed portion 306 prevents the leader pin 214 from sliding out of the slot 304 during motion of the hub filler 300.

The hub filler 300 has a vertically oriented guide pin 302 attached thereto located at approximately ⅓ the length of the hub filler 300 away from the second pin 252. The guide pin 302 has a portion that extends below the hub filler 300 and is capable of extending within the first guide track 247 when the hub filler 300 is positioned above the first guide track 247. The guide pin 302 has a portion that extends below the hub filler 300 and is capable of extending within the third guide track 313 when the hub filler 300 is positioned over the third guide track 313.

The first guide track 247 has a linear portion 248 (see FIG. 16) and an arcuate portion 249 and is constructed by forming a slot through the lower planar member 446. The lower planar member 446 is arranged in a plane below the hub filler 300 and the load arm 250. The arcuate portion 249 has a radius of curvature equal to the distance between the center pin 254 and the second pin 252 when the center pin 254 is located at the first end 253 of the center track 255. The linear portion 248 of the first guide track 247 extends to a position adjacent to a radial channel 244 in take-up reel 242 for receiving the hub filler 300 and the tape leader pin 214.

As seen in FIG. 16, the automatic tape loading mechanism includes a third guide track 313 that has a slot 317. The third guide track 313 has a first end 314 located adjacent a terminal end of the first guide track 247. A first end of the third guide track 313 is mounted on an upper terminal end of a third pin 316. The third guide track 313 rotates about the third pin 316. The lower portion of the guide pin 302 extends below the hub filler 300 and into the third guide track 313 when the hub filler 300 is positioned over the third guide track 313.

Figure 18:
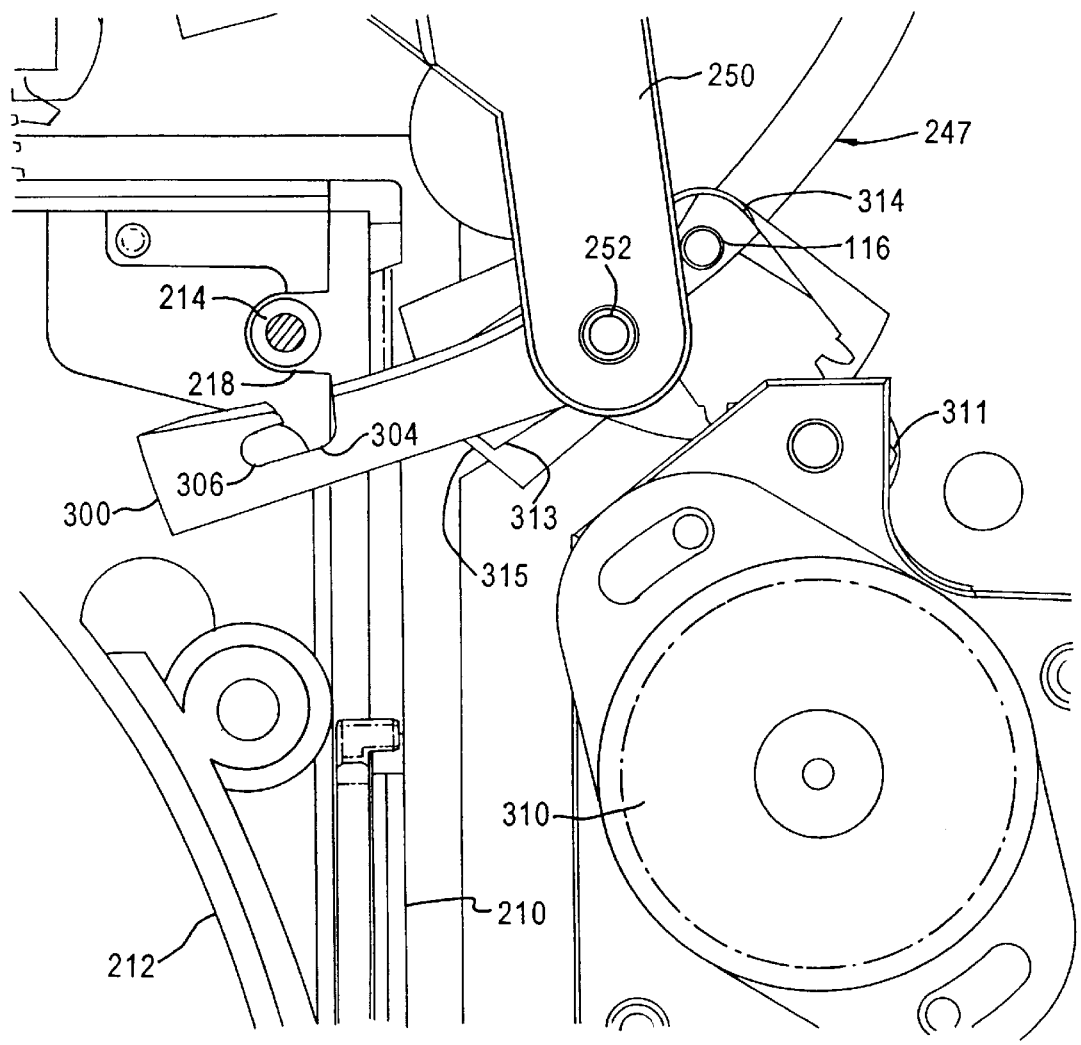
FIG. 18 is an enlarged view of a tape drive loading mechanism according to a second, or preferred, embodiment of the present invention with the hub filler positioned within the tape cartridge adjacent the leader pin.
Figure 22:
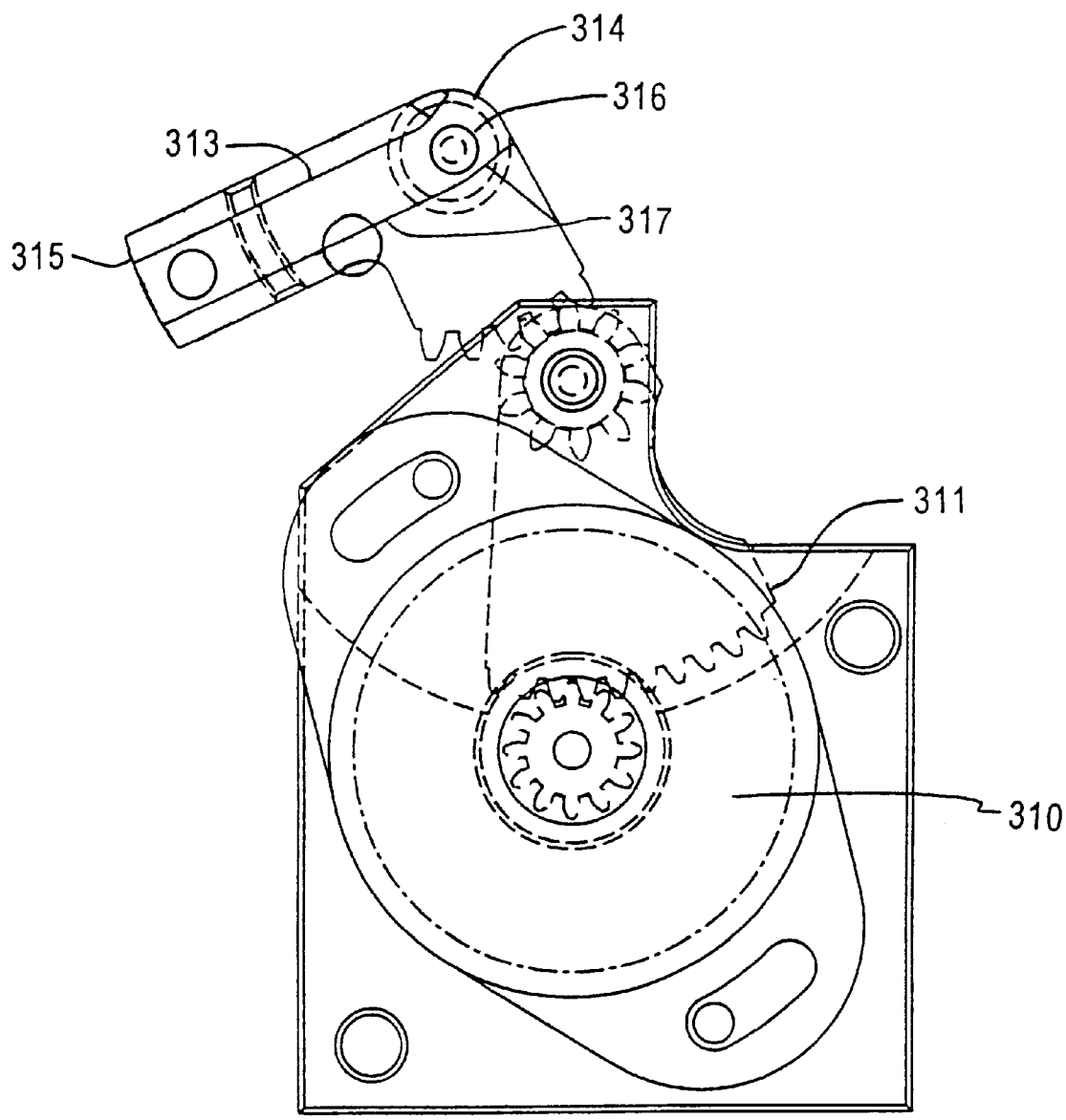
FIG. 22 is a top view of the second motive element according to a second, or preferred, embodiment of the present invention with phantom lines.

Referring to FIG. 22, the motive element 310 is mounted to the transport cabinet 240 and includes an gear member 311 engaged to a gear portion on the third guide track 313 near the second end 315. The motive element 310 operates in a conventional manner and therefore is not described herein in detail. The motive element 310 uses a shaft having a gear thereon to rotate the gear member 311 to force the third guide track 313 to rotate about the third pin 316. The gear member 311 of the motive element 310 is rotated counterclockwise when the guide pin 302 of the hub filler 300 is located near the second end 315 of the third guide track 313, as depicted in FIG. 18. The gear member 311 of the motive element 310 is used to rotate the third guide track 313 about the third pin 316, thereby pushing the guide pin 302 and forcing the hub filler 300 to rotate about the second pin 252. This movement will be shown in later Figures.

Figure 23:
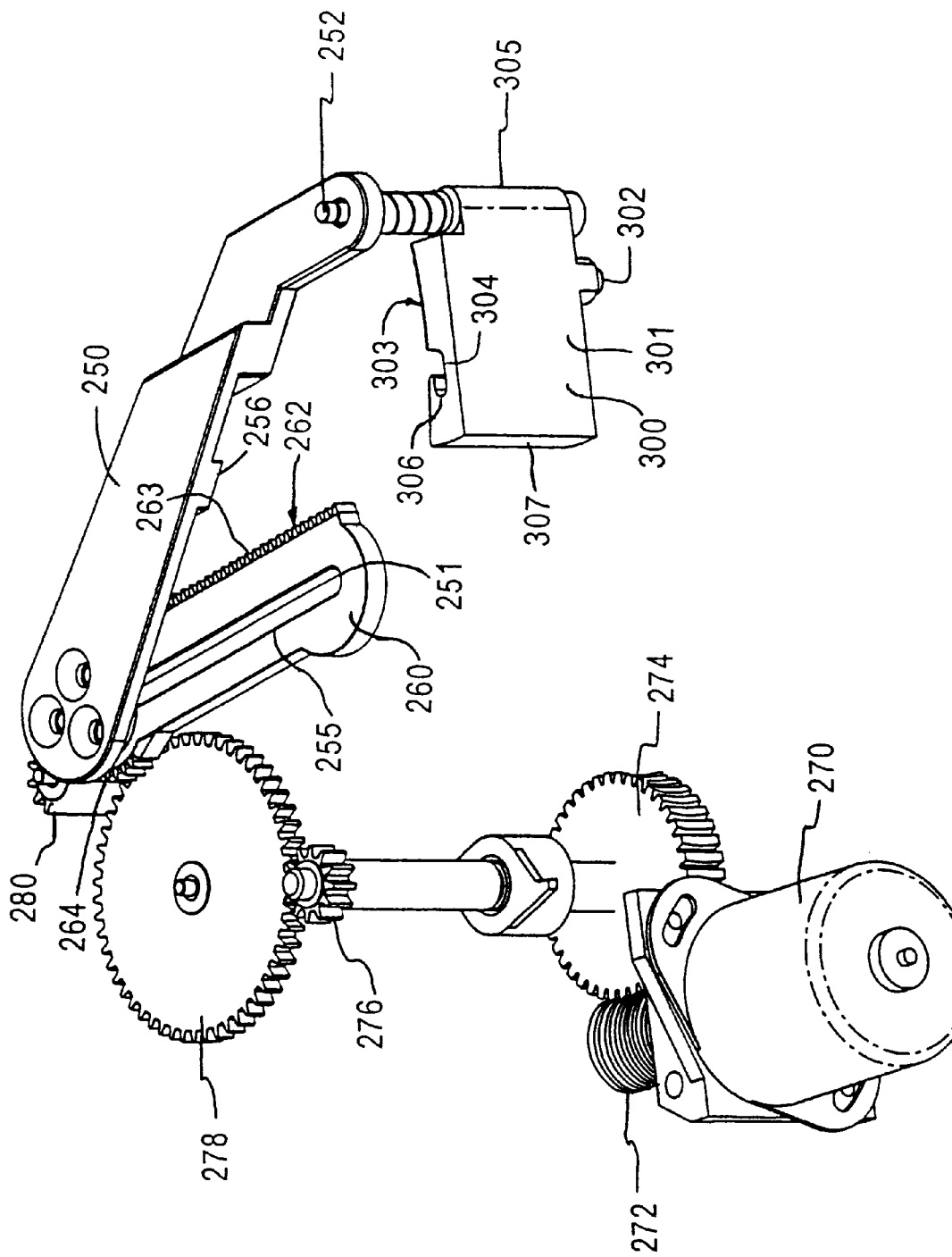
FIG. 23 is a perspective view of a first motive element, gear assembly, load arm, load gear arm, and hub filler according to a second, or preferred, embodiment of the present invention.

The second embodiment of the present invention includes a first drive motor 270 (or motive element) driving a plurality of interconnecting gears including a worm 272 having teeth which are engaged to a mating worm gear 274, as depicted in FIG. 23. Worm gear 274 transfers the motion from worm 272 to gear 276 that is rigidly connected to worm gear 274. Gear 276 is a spur gear having teeth that are engaged with teeth on spur gear 278, which are engaged to the teeth on spur gear 280. Gear 280 has teeth that are engaged to the gear teeth 262 on the load gear arm 260. The plurality of interconnected gears allow the first drive motor 270 to force the load gear arm 260 and the load arm 250 to rotate and translate on the center pin 254 within the center track 255. The motion of the load gear arm 260 and connected load arm 250 can be controlled by the direction and amount of rotation of the worm 272 caused by the motor 270 that includes an encoder.

Figure 19:
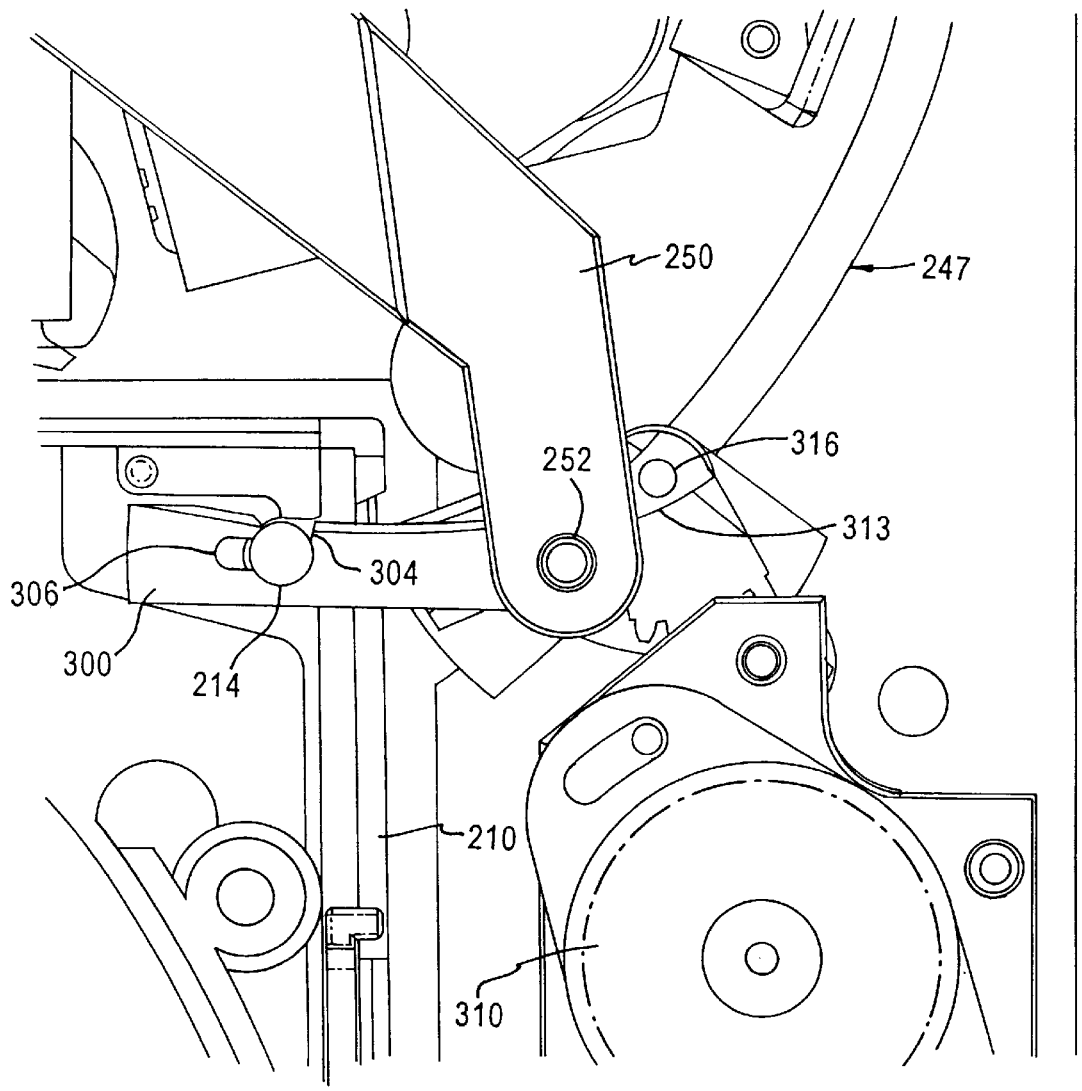
FIG. 19 is an enlarged view of a tape drive loading mechanism according to a second, or preferred, embodiment of the present invention depicting the slot of the hub filler in contact with the leader pin.
Figure 20:
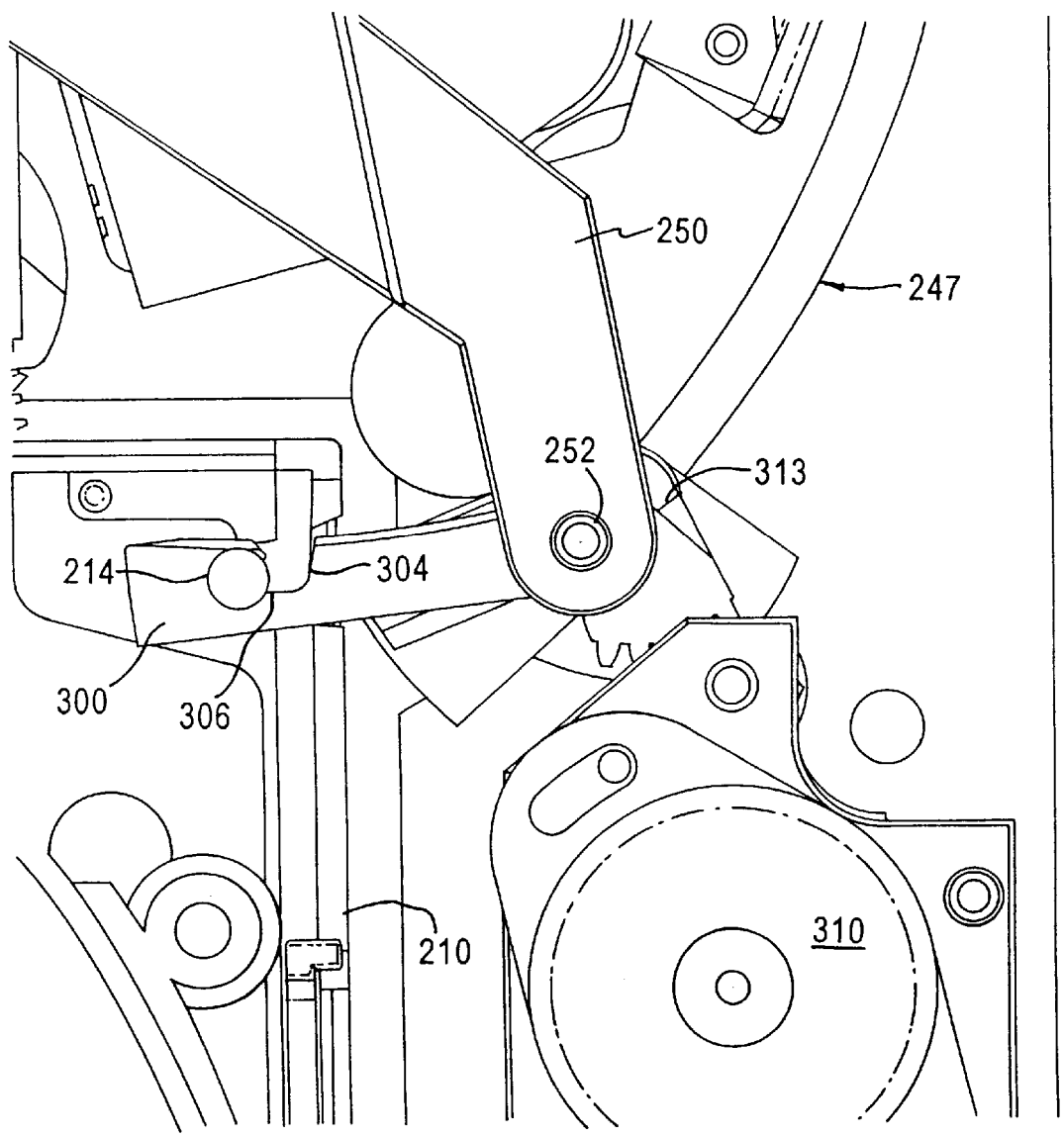
FIG. 20 is an enlarged view of a tape drive loading mechanism according to a second, or preferred, embodiment of the present invention depicting the leader pin positioned within a recessed portion of the hub filler.
Figure 21:
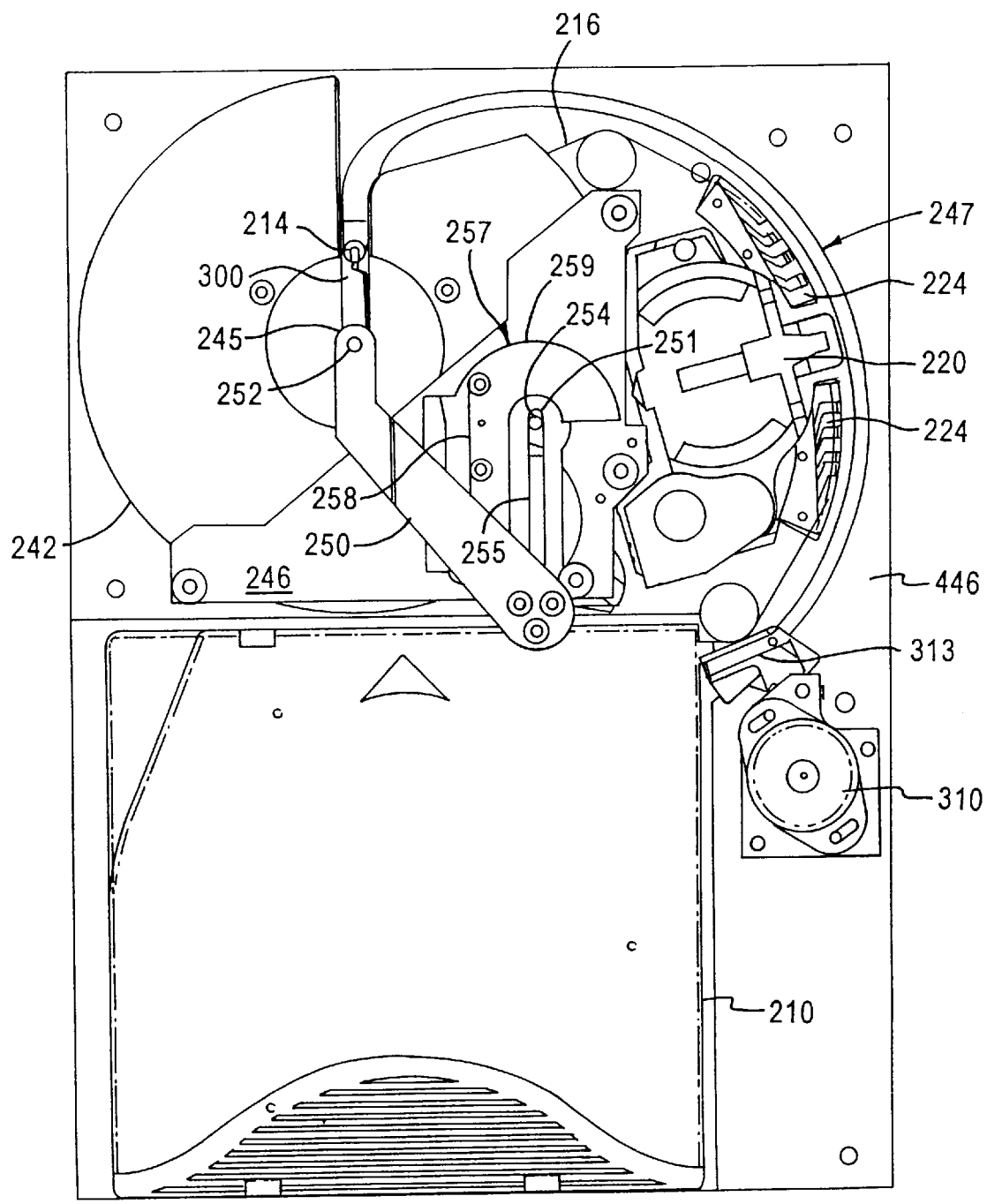
FIG. 21 depicts a tape drive loading mechanism according to a second, or preferred, embodiment of the present invention with the load arm and the hub filler in an end position and the tape cartridge in a loaded state.

FIGS. 15–21 depict the tape drive loading mechanism at various positions as it brings the tape cartridge 210 from the unloaded state to the loaded state. FIGS. 15 and 16 depict the load arm 250 and the load gear arm 260 in the start position, and the tape cartridge 210 in the unloaded state. FIG. 21 depicts the load arm 250 and the load gear arm 260 in the end position, and the tape cartridge in the loaded state. As will be more fully discussed later, in order to move the tape drive loading mechanism of the present invention from the loaded state to the unloaded state, the process is reversed.

Figure 17:
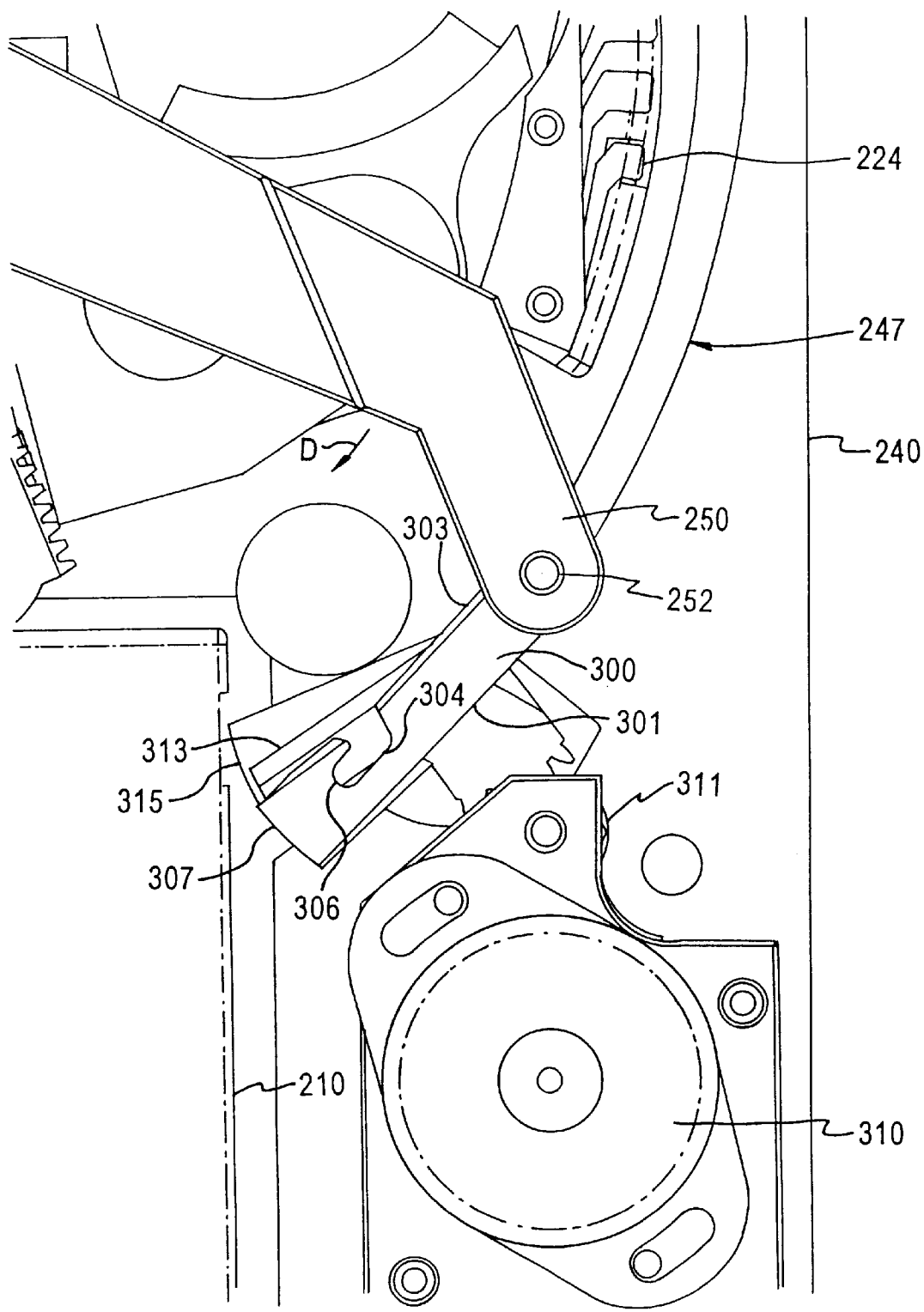
FIG. 17 is an enlarged view of a portion of a tape drive loading mechanism according to a second, or preferred, embodiment of the present invention with the load arm and hub filler in the start position.

Referring to FIGS. 15–17, in the start position the load arm 250 is positioned so the hub filler 300 is located outside but near the tape cartridge 210 and the guide pin 302 is positioned within the arcuate portion 249 of the first guide track 247. The hub filler 300 should not interfere with the loading and unloading of the tape cartridge 210 from the transport cabinet 240 when the tape drive loading mechanism is in the start position. The gear member 311 of the motive element 310 is in the start position when the tape drive loading mechanism is in the start position. The tape cartridge 210 is in the unloaded state wherein the leader pin 214 rests within the recessed portion 218 and the tape 216 is fully wrapped around the reel 212.

The motor 270 is then activated such that it causes, through the gear assembly's connection with the gear teeth 262, the clockwise rotation of the load gear arm 260 in the direction of arrow D. The clockwise rotation of the load gear arm 260 about the center pin 254 causes the clockwise rotation of the load arm 250. The clockwise rotation of the load arm 250 forces the hub filler 300 to move and the guide pin 302 to translate along the first guide track 247 to the third guide track 313. The location of the first end 314 of the third guide track 313 directly adjacent the terminal end of the first guide track 247 ensures that the guide pin 302 will slide smoothly from the first guide track 247 into the third guide track 313, and vice versa. As the load arm 250 rotates in a clockwise direction and the guide pin 302 is forced towards a second end 315 of the third guide track 313.

FIG. 18 depicts the hub filler 300 positioned adjacent the leader pin 214. This position represents the furthest clockwise rotation of the load gear arm 260 and the load arm 250.

Once the load gear arm 260 and the load arm 250 are in their furthest clockwise rotation, the movement of the gear member 311 of the motive element 310 rotates counterclockwise which causes the third guide track 313 to rotate in a clockwise direction about the third pin 316. The clockwise rotation of the third guide track 313 pushes the guide pin 302, thereby forcing the hub filler 300 to rotate in a clockwise direction about the second pin 252 to a position as depicted in FIG. 19. In this position the leader pin 214 is positioned within the slot 304 of the hub filler 300. The hub filler 300 is rotated by the rotation of the gear member 311 from the start position, as depicted in FIGS. 15–18, to the end position, as depicted in FIG. 19. The gear member 311 remains in the end position until the leader pin 214 is unloaded.

Once the leader pin 214 is within the slot 304 on the hub filler 300, the motor 270 is used to slightly rotate the load arm 250 in a counterclockwise direction about the center pin 254 to a position depicted in FIG. 20. In this position the leader pin 214 is positioned within the recessed portion 306 of the hub filler 300 to prevent the leader pin 214 from sliding out of the slot 304 during subsequent motion of the hub filler 300. In order to cause the counterclockwise rotation of the load arm 250, the direction of rotation of the motor 270 is reversed thereby causing the plurality of gears to rotate in reverse directions. The plurality of gears act upon the arcuate portion 264 of the gear teeth 262 of the load gear arm 260 to cause the counterclockwise rotation of the load gear arm 260 and the load arm 250.

The motor 270 then continues to rotate the load gear arm 260 and the load arm 250 in a counterclockwise direction about the center pin 254. The hub filler 300 begins to pull the leader pin 214, and thereby begins to unwind the tape 216 from the reel 212. The guide pin 302 of the hub filler 300 is being guided by the third guide track 313 towards the first guide track 247. The load arm 250 continues to force hub filler 300 to unwind the tape 216 from the reel 212 and the leader pin 214 is pulled free from the tape cartridge 210. The guide pin 302 of the hub filler 300 moves within the arcuate portion 249 of the first guide track 247. During the rotation of the load arm 250 and the hub filler 300, the guide pin 302 travels within the arcuate portion 249 of the first guide track 247 and the offset member 256 travels along the arcuate portion 259 of the fourth guide track 257.

The hub filler 300 travels past the head 222 of the head assembly 220 as described for the first embodiment. As the hub filler 300 passes the head assembly 220, there is clearance between the hub filler 300 and the head 222 and between the hub filler 300 and the side of the transport cabinet 240. The tape 216 is positioned in contact with the head 222 in order to facilitate the transfer of data between the head assembly 220 and the data storage medium or tape 216. As the hub filler 300 pulls the tape 216, the tape 216 is guided by a plurality of tape guides 224 that properly position the tape 216 against the head 222 and prevent any damage to the tape 216.

The load arm 250 continues to rotate and translate in a similar manner as described above for the first embodiment until the load arm 250 reaches the position depicted in FIG. 21. FIG. 21 depicts the load arm 250 and the hub filler 300 in the end position and the tape cartridge 210 in the loaded state. In the end position, the second pin 252 is located at the center 245 of the take-up reel 242. The hub filler 300 is shaped and sized to fit within the channel 244 of the take-up reel 242. The load arm 250 will remain stationary in the end position until unloading of the leader pin 214.

At the position, the motor 270 stops rotating, and thereby discontinues the travel of the load gear arm 260 and the load arm 250 along the center track 255. The center pin 254 has reached a position near a second end 251 of the center track 255 and the offset member 256 has reached an end of the linear portion 258 of the fourth guide track 257. The tape leader pin 214 is positioned to begin winding the tape 216 about the hub 241 of the take-up reel 242.

Sensors may be used on either of the embodiments to control the motion of the first and second motive elements and the motors used to control the rotation of the reels. As depicted in FIG. 16, a magnet 500 is positioned on the load arm 250 and hall effect sensors 502 are positioned at various points on the cabinet or the planar members such that as the load arm 250 rotates and translates the magnet 500 will pass near the sensors 502. In addition opto-interrupt or reflect sensors 504 may be used to detect the position of the hub filler 300. Furthermore, a mechanical switch 506 may be used to detect the positioning of the third guide track 313.

The various parts of the tape drive loading mechanism of the present invention are constructed of conventional materials that are rigid, lightweight, and durable. Examples of such materials include, but are not limited to, plastics, lightweight metals, or composite materials. The amount of friction between various moving parts should be minimized through the use of conventional lubricants and the manufacture of the various parts using low friction materials.

In the previous descriptions, numerous specific details are set forth, such as specific materials, structures, processes, etc., in order to provide a thorough understanding of the present invention. However, as one having ordinary skill in the art would recognize, the present invention can be practiced without resorting to the details specifically set forth. In other instances, well known structures have not been described in detail in order not to unnecessarily obscure the present invention.

Only two embodiments of the invention are depicted and described in the present disclosure. It is to be understood that the invention is capable of use in various other combinations and environments and is capable of changes or modifications within the scope of the inventive concept as expressed herein.

What is claimed is:

1. A tape drive loading mechanism within a housing for loading a tape leader, having a tape leader pin integral therewith, from a tape cartridge to a take-up reel, said loading mechanism comprising:

a load member rotatably and translatably mounted relative to the housing;

a first guide track having an arcuate portion and a linear portion;

a hub filler integrally attached to said load member, said hub filler having a slot for receiving the tape leader sin, said hub filler having a guide portion extending within said first guide track; and a first motive element engaged to said load member and energizable to rotate and translate said load member and thereby move said hub filler along said first guide track so that said hub filler transports the tape leader from an unloaded state on the tape cartridge to a loaded state on the take-up reel.

2. The tape drive loading mechanism according to claim 1 wherein said slot of said hub filler has a recessed portion thereon.

3. The tape drive loading mechanism according to claim 1, wherein said loading mechanism includes a second guide track having a linear portion, said second guide track having a load member pin extending therein from said load member.

4. The tape drive loading mechanism according to claim 3 further comprising:

a fourth guide track having an arcuate portion and a linear portion; and wherein said load member has mounted thereon an offset pin, offset from said first pin, said offset pin engaging said fourth guide track.

5. The tape drive loading mechanism according to claim 1 further comprising:

a second guide track mounted to the housing and having a linear portion; and wherein said load member is mounted to a first pin, said first pin extending within said second guide track.

6. The tape drive loading mechanism according to claim 5 further comprising:

a fourth guide track having an arcuate portion and a linear portion; and wherein said load member has a radial pin offset from said first pin, said radial pin extending within said fourth guide track.

7. The tape drive loading mechanism according to claim 1 wherein said load member has an elongated load arm having a second pin attached thereto, said hub filler being rotatably attached to said elongated load arm at said second pin.

8. The tape drive loading mechanism according to claim 1 wherein said load member has a load gear arm having gear teeth thereon, said first motive element being engaged to said gear teeth.

9. The tape drive loading mechanism according to claim 8 wherein said load gear arm has an arcuate portion having gear teeth thereon and a linear portion having gear teeth thereon.

10. The tape drive loading mechanism according to claim 8 wherein said first motive element is engaged to said gear teeth on said load gear arm by a plurality of interconnected gears.

11. The tape drive loading mechanism according to claim 1 further comprising:
a third guide track having a first end abutting said first guide track, said third guide track having a third pin at said first end thereof, said third guide track being rotatable about said third pin, said guide portion of said hub filler extending within said third guide track.

12. The tape drive loading mechanism according to claim 11 further comprising:
a second motive element engaged to said third guide track, whereby said second motive element is configured to force said third guide track to rotate about said third pin to receive the tape leader within said slot of said hub filler.

13. A method of loading a leader pin attached to a tare in a tape cartridge to a take-up reel, said method comprising the steps of:
rotating a load member in a first direction to a position adjacent the leader pin when the leader pin is in an unloaded state on the tape cartridge;
engaging the leader pin with a slot in a hub loader attached to said load member;
rotating the load member in a second direction to transport the leader pin to a position adjacent the take-up reel; and
moving the load member translationally to position the leader pin within the take-up reel.

14. The method according to claim 13 further comprising the step of rotating the load member to position the leader pin within a recessed portion of the slot of the second member.

15. The method according to claim 13 wherein the steps of rotating and moving the load member include operating a first motive element engaged to the load member to rotate and translate the load member.

16. The method according to claim 13 wherein the load member includes a guide track having a linear portion, the guide track having a first pin extending therein, and wherein the steps of rotating and and moving the load member includes rotating and translating the load member and second guide track relative to the first pin.

17. The method according to claim 16 wherein the load member has a member offset from the first pin, and the offset member engages an additional guide track having an arcuate portion and a linear portion.

18. The method according to claim 13 wherein the load member is mounted to a first pin, the first pin extends within a second guide track having a linear portion, and wherein the steps of rotating and moving the load member includes rotating and translating the first pin within the second guide track.

19. The method according to claim 13 wherein the step of engaging the leader pin within the slot includes the step of rotating a third guide track about a third pin, the hub loader having a guide portion extending within the third guide track, thereby rotating the second member to receive the leader pin within the slot.

* * * * *